United States Patent
Wang et al.

(10) Patent No.: US 11,290,232 B2
(45) Date of Patent: Mar. 29, 2022

(54) COMMUNICATIONS METHOD AND APPARATUS

(71) Applicant: HUAWEI TECHNOLOGIES CO., LTD., Guangdong (CN)

(72) Inventors: Lei Wang, Shanghai (CN); Yan Chen, Shanghai (CN); Zukang Shen, Beijing (CN); Lei Zhang, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 68 days.

(21) Appl. No.: 16/683,847

(22) Filed: Nov. 14, 2019

(65) Prior Publication Data

US 2020/0084000 A1 Mar. 12, 2020

Related U.S. Application Data

(63) Continuation of application No. PCT/CN2018/086882, filed on May 15, 2018.

(30) Foreign Application Priority Data

May 15, 2017 (CN) .......................... 201710340130.3
Feb. 2, 2018 (CN) .......................... 201810105288.7

(51) Int. Cl.
*H04L 5/00* (2006.01)
*H04L 27/26* (2006.01)

(52) U.S. Cl.
CPC .......... *H04L 5/0048* (2013.01); *H04L 5/0007* (2013.01); *H04L 5/0094* (2013.01); *H04L 27/2613* (2013.01)

(58) Field of Classification Search
CPC ..... H04L 5/005; H04L 5/0048; H04B 7/0456; H04B 7/0482; H04B 7/0617
See application file for complete search history.

(56) References Cited

U.S. PATENT DOCUMENTS

| | | | |
|---|---|---|---|
| 9,967,015 B2* | 5/2018 | Bengtsson | ........... H04B 7/0626 |
| 2012/0207197 A1 | 8/2012 | Lv et al. | |
| 2014/0098689 A1 | 4/2014 | Lee et al. | |

FOREIGN PATENT DOCUMENTS

| | | |
|---|---|---|
| CN | 102111186 A | 6/2011 |
| CN | 103428858 A | 12/2013 |

OTHER PUBLICATIONS

R1-1705253; National Instruments; Discussion on Signaling for PT-RS; 3GPP TSG RAN WG1 Meeting #88bis; Spokane, USA Apr. 3-7, 2017; Agenda item: 8.1.2.4.3; total 10 pages.

(Continued)

*Primary Examiner* — Kevin Kim
(74) *Attorney, Agent, or Firm* — Womble Bond Dickinson (US) LLP

(57) ABSTRACT

This application provides a communications method and apparatus, to improve data transmission reliability. The method includes: determining, by a terminal device, M pilot ports that are used to transmit one data stream, where M is a positive integer greater than or equal to 2; and sending, by the terminal device to a network device, M pilot signals and the data stream that have been subject to same precoding processing, where the M pilot signals are respectively generated based on the M pilot ports.

8 Claims, 16 Drawing Sheets

(56) References Cited

OTHER PUBLICATIONS

3GPP TS 38.211 V0.0.0 (May 2017),3rd Generation Partnership Project;Technical Specification Group Radio Access Network;NR;Physical channels and modulation(Release 15),total 10 pages.
R1-1612857; Nokia, Alcatel-Lucent Shanghai Bell; On considerations for NR DM-RS for data channels; 3GPP TSG-RAN WG1#87; Reno, U.S.A., Nov. 14-18, 2016; Agenda item: 7.1.3.2; total 14 pages.
R1-1700067; Huawei, HiSilicon; Design of DL DMRS for data transmission; 3GPP TSG RAN WG1 NR Ad-Hoc Meeting; Spokane, USA, Jan. 16-20, 2017; Agenda Item: 5.1.2.3.2; total 4 pages.
3GPP TSG RAN WG1 NR Ad-Hoc Meeting,R1-1700138:"Discussion on RS for phase tracking",ZTE,Jan. 20, 2017,total 10 pages.
3GPP TSG RAN WGI NR Ad-Hoc Meeting ,RI-1700135,:"Discussion on downlink DMRS design",ZTE,Jan. 20, 2017,total 9 pages.
3GPP TSG RA WG1 Meeting RAN1-NR ,R1-1700844,:"Pilot Scrambling Sequences for DMRS Port Multiplexing", Cohere Technologies,Jan. 20, 2017,total 7 pages.
3GPP TSG RAN WG1 Meeting #88bis ,R1-1704233:Design of DL DMRS for data transmission,Apr. 7, 2017,total 6 sages.
3GPP TSG RAN WG1 Meeting #89,R1-1707132:"Discussion on RS for phase tracking",ZTE,May 7, 2017,total 11 pages.

\* cited by examiner

COMMUNICATIONS METHOD AND APPARATUS

CROSS-REFERENCE TO RELATED APPLICATIONS

This application is a continuation of International Application No. PCT/CN2018/086882, filed on May 15, 2018, which claims priority to Chinese Patent Application No. 201710340130.3, filed on May 15, 2017 and Chinese Patent Application No. 201810105288.7, filed on Feb. 2, 2018. The disclosures of the aforementioned applications are hereby incorporated by reference in their entireties.

TECHNICAL FIELD

This application relates to the communications field, and more particularly, to a communications method and apparatus in the communications field.

BACKGROUND

An existing network system uses a specific pilot to perform channel estimation, tracking, measurement, and the like. However, there are different requirements for pilots in different scenarios. For example, in a future network system, there may be different requirements for pilots in three scenarios, namely, enhanced mobile broadband (eMBB), ultra-reliable and low-latency communications (URLLC), and massive machine type communications (mMTC). For example, in a URLLC scenario, not only a low latency but also transmission reliability is required; therefore, high-density pilots may be required to perform channel estimation. Because of diversified future network system scenarios, there are also diversified requirements for pilots sent by a transmit end. For example, use of a specific pilot may degrade channel estimation performance, or use of a specific pilot may degrade detection performance. Therefore, if an existing specific pilot is used, a communication requirement in a future application scenario is not met, and data transmission reliability is limited.

SUMMARY

This application provides a communications method and apparatus, to improve data transmission reliability.

According to a first aspect, a communications method is provided. The method includes: determining, by a terminal device, M pilot ports that are used to transmit one data stream, where M is a positive integer greater than or equal to 2; and sending, by the terminal device to a network device, M pilot signals and the data stream that have been subject to same precoding processing, where the M pilot signals are respectively generated based on the M pilot ports.

In this way, in this embodiment of this application, the network device can determine the M pilot ports for transmitting the data stream, so that the M pilot signals for transmitting the data stream can be aggregated, thereby improving data transmission reliability.

In one embodiment, the terminal device may determine, based on the M pilot ports, a time-frequency resource and a pilot sequence that correspond to each pilot port. One pilot signal can be generated by using one time-frequency resource and one pilot sequence, so that the terminal device can generate the M pilot signals based on the M pilot ports.

In one embodiment, the method further includes: receiving, by the terminal device, first indication information sent by the network device, where the first indication information is used to indicate the M pilot ports; and determining, by the terminal device according to the first indication information, the M pilot ports that are used to transmit the data stream.

In one embodiment, the first indication information may indicate a number of each of the M pilot ports, or the first indication information is used to indicate a number of a new pilot port formed by the M pilot ports.

Certainly, the first indication information may alternatively indicate an identifier of each of the M pilot ports, or is used to indicate an identifier of a new pilot port formed by the M pilot ports.

In one embodiment, the receiving, by the terminal device, first indication information sent by the network device includes: receiving, by the terminal device, the first indication information that is sent by the network device by using downlink control information or radio resource control signaling.

In one embodiment, a first pilot port in the M pilot ports belongs to a first pilot port set; a second pilot port in the M pilot ports belongs to a second pilot port set; pilot signals corresponding to any two pilot ports in the first pilot port set occupy a same time-frequency resource; any two pilot ports in the second pilot port set correspond to a same time-frequency resource; and a time-frequency resource corresponding to any pilot port in the first pilot port set is orthogonal to a time-frequency resource corresponding to any pilot port in the second pilot port set.

In one embodiment, a first pilot port set and a second pilot port set include a same quantity of pilot ports, and the quantity is at least one.

In this embodiment of this application, the M aggregated pilot ports may be from different pilot port sets.

In one embodiment, the first pilot port in the M pilot ports may be a pilot port in the first pilot port set; the second pilot port in the M pilot ports may be a pilot port in the second pilot port set; and a third pilot port in the M pilot ports may be a pilot port in the first pilot port set or the second pilot port set. In one embodiment, some of the M pilot ports may belong to a same pilot port set, but at least two of the M pilot ports are from different pilot port sets.

In one embodiment, a ranking corresponding to a number of the first pilot port in the first pilot port set is the same as or different from a ranking corresponding to a number of the second pilot port in the second pilot set.

In one embodiment, any two of the M pilot ports belong to a same pilot port set; any two pilot ports in the same pilot port set correspond to a same time-frequency resource; and pilot sequences corresponding to any two different pilot ports are orthogonal.

In this embodiment of this application, the M aggregated pilot ports may be from a same pilot port set.

According to a second aspect, a communications method is provided. The method includes: determining, by a network device, M pilot ports that are used by a terminal device to transmit one data stream, where M is a positive integer greater than or equal to 2; sending, by the network device, first indication information to the terminal device, where the first indication information is used to indicate the M pilot ports; and receiving, by the network device, M pilot signals and the data stream that have been subject to same precoding processing and that are sent by the terminal device, where the M pilot signals are respectively generated based on the M pilot ports.

In one embodiment, the sending, by the network device, first indication information to the terminal device includes:

sending, by the network device, the first indication information by using downlink control information or radio resource control signaling.

In one embodiment, a first pilot port in the M pilot ports belongs to a first pilot port set; a second pilot port in the M pilot ports belongs to a second pilot port set; pilot signals corresponding to any two pilot ports in the first pilot port set occupy a same time-frequency resource; any two pilot ports in the second pilot port set correspond to a same time-frequency resource; and a time-frequency resource corresponding to any pilot port in the first pilot port set is orthogonal to a time-frequency resource corresponding to any pilot port in the second pilot port set.

In one embodiment, any two of the M pilot ports belong to a same pilot port set; any two pilot ports in the same pilot port set correspond to a same time-frequency resource; and pilot sequences corresponding to any two different pilot ports are orthogonal.

According to a third aspect, a communications method is provided. The method includes: determining, by a terminal device, a target pilot port that is used to transmit one data stream, where time-frequency resources corresponding to the target pilot port include a time-frequency resource corresponding to a first pilot port and a time-frequency resource corresponding to a second pilot port, and the time-frequency resource corresponding to the first pilot port is different from the time-frequency resource corresponding to the second pilot port; or a time-frequency resource corresponding to the target pilot port is the same as a time-frequency resource corresponding to the first pilot port, and a pilot sequence corresponding to the target pilot port is superposition of a pilot sequence corresponding to the first pilot port and a pilot sequence corresponding to the second pilot port; and sending, by the terminal device to a network device, a target pilot signal and the data stream that have been subject to same precoding processing, where the target pilot signal is generated based on the target pilot port.

In one embodiment, the time-frequency resource corresponding to the target pilot port is the same as the time-frequency resource corresponding to the first pilot port, and in a same time transmission unit, the pilot sequence corresponding to the target pilot port is superposition of the pilot sequence corresponding to the first pilot port and the pilot sequence corresponding to the second pilot port.

In one embodiment, the terminal device receives first indication information sent by the network device, where the first indication information is used to indicate the target pilot port.

In one embodiment, the receiving, by the terminal device, first indication information sent by the network device includes: receiving, by the terminal device, the first indication information that is sent by the network device by using downlink control information or radio resource control signaling.

In one embodiment, if the time-frequency resources corresponding to the target pilot port include the time-frequency resource corresponding to the first pilot port and the time-frequency resource corresponding to the second pilot port, a time-frequency resource occupied by the target pilot port is a union set of a time-frequency resource occupied by the first pilot port and a time-frequency resource occupied by the second pilot port.

According to a fourth aspect, a communications method is provided. The method includes: determining, by a network device, a target pilot port that is used by a terminal device to transmit one data stream, where time-frequency resources corresponding to the target pilot port include a time-frequency resource corresponding to a first pilot port and a time-frequency resource corresponding to a second pilot port, and the time-frequency resource corresponding to the first pilot port is different from the time-frequency resource corresponding to the second pilot port; or a time-frequency resource corresponding to the target pilot port is the same as a time-frequency resource corresponding to the first pilot port, and a pilot sequence corresponding to the target pilot port is superposition of a pilot sequence corresponding to the first pilot port and a pilot sequence corresponding to a second pilot port; sending, by the network device, first indication information to the terminal device, where the first indication information is used to indicate the target pilot port; and receiving, by the network device, a target pilot signal and the data stream that have been subject to same precoding processing and that are sent by the terminal device, where the target pilot signal is generated based on the target pilot port.

In one embodiment, the sending, by the network device, first indication information to the terminal device includes: sending, by the network device, the first indication information by using downlink control information or radio resource control signaling.

In one embodiment, if the time-frequency resources corresponding to the target pilot port include the time-frequency resource corresponding to the first pilot port and the time-frequency resource corresponding to the second pilot port, a time-frequency resource occupied by the target pilot port is a union set of a time-frequency resource occupied by the first pilot port and a time-frequency resource occupied by the second pilot port.

According to a fifth aspect, a communications method is provided. The method includes: determining, by a network device, a target pilot in a pilot set, where the pilot set includes at least a first pilot and a second pilot, and a time-frequency resource occupied by the first pilot partially overlaps a time-frequency resource occupied by the second pilot; sending, by the network device, first indication information to a terminal device, where the first indication information is used to indicate the target pilot in the pilot set; and communicating, by the network device, with the terminal device by using the target pilot.

In this embodiment of this application, the network device may determine the target pilot in the pilot set, and time-frequency resources occupied by pilots in the pilot set may overlap, and in one embodiment, the time-frequency resources occupied by the first pilot and the second pilot in the pilot set may include some common time-frequency resources. The pilots included in the pilot set may occupy some different time-frequency resources and some same time-frequency resources. In this way, diversified pilots in the pilot set can meet requirements for pilots in different application scenarios, and can improve pilot sending flexibility, thereby improving data transmission reliability.

In one embodiment, the first indication information is used to indicate a number of the target pilot in the pilot set. Certainly, the first indication information may alternatively indicate a name of the target pilot in the pilot set, or the like. This is not limited in this embodiment of this application.

In one embodiment, the target pilot is generated by using a target pilot sequence and a target pilot pattern.

In one embodiment, a high-density pilot pattern in the pilot set is a union set of a plurality of low-density pilot patterns.

In one embodiment, a density of the time-frequency resource occupied by the first pilot is different from a density of the time-frequency resource occupied by the second pilot.

In one embodiment, the time-frequency resource occupied by the first pilot is a union set of the time-frequency resource occupied by the second pilot and a time-frequency resource occupied by a third pilot in the pilot set.

In one embodiment, a part of a pilot sequence corresponding to the first pilot is the same as at least a part of a pilot sequence corresponding to the second pilot. In one embodiment, the pilot sequence corresponding to the first pilot may include all of the pilot sequence corresponding to the second pilot, or a part of the pilot sequence corresponding to the first pilot may be the same as a part of the pilot sequence corresponding to the second pilot sequence.

In one embodiment, a pilot sequence corresponding to a pilot in the pilot set is generated based on cyclic shifts of pilot sequences corresponding to at least two pilots in the pilot set.

In one embodiment, a pilot sequence corresponding to a pilot in the pilot set is generated based on a PN sequence.

In one embodiment, the determining, by a network device, a target pilot in a pilot set includes: determining, by the network device, the target pilot in the pilot set based on quality of a channel between the network device and the terminal device or a priority of the terminal device.

In one embodiment, the sending, by the network device, first indication information to a terminal device includes: sending, by the network device, the first indication information to the terminal device by using RRC signaling or DCI.

According to a sixth aspect, a communications method is provided. The method includes: determining, by a terminal device, a target pilot in a pilot set, where the pilot set includes at least a first pilot and a second pilot, and a time-frequency resource occupied by the first pilot partially overlaps a time-frequency resource occupied by the second pilot; and communicating, by the terminal device, with a network device by using the target pilot.

In one embodiment, the determining, by a terminal device, a target pilot in a pilot set includes: determining, by the terminal device, the target pilot in the pilot set based on channel quality or a priority of the terminal device.

In one embodiment, a density of the time-frequency resource occupied by the first pilot is different from a density of the time-frequency resource occupied by the second pilot.

In one embodiment, the time-frequency resource occupied by the first pilot is a union set of the time-frequency resource occupied by the second pilot and a time-frequency resource occupied by a third pilot in the pilot set.

In one embodiment, a part of a pilot sequence corresponding to the first pilot is the same as at least a part of a pilot sequence corresponding to the second pilot.

In one embodiment, the method further includes: receiving, by the terminal device, first indication information sent by the network device, where the first indication information is used to indicate the target pilot in the pilot set; and the determining, by a terminal device, a target pilot in a pilot set includes: determining, by the terminal device, the target pilot in the pilot set according to the first indication information.

In one embodiment, the receiving, by the terminal device, first indication information sent by the network device includes: receiving, by the terminal device, the first indication information that is sent by the network device by using radio resource control RRC signaling or downlink control information DCI.

According to a seventh aspect, a communications method is provided. The method includes: determining, by a network device in a pilot set, M pilots that are used to transmit N data streams, where M and N are positive integers, and M is greater than N; sending, by the network device, first indication information to a terminal device, where the first indication information is used to indicate the M pilots in the pilot set; and communicating, by the network device, the N data streams to the terminal device by using the M pilots.

In this embodiment of this application, the network device may determine the M pilots for transmitting the N data streams, and a quantity of the pilots is greater than a quantity of the data streams, so that aggregation of the M pilots for transmitting the N data streams can improve data transmission reliability.

In one embodiment, the first indication information is further used to indicate correspondences between the N data streams and the M pilots.

In one embodiment, the correspondences between the N data streams and the M pilots may be indicated by the network device by using the first indication information, or may be pre-agreed on in a protocol. This is not limited in this embodiment of this application.

In one embodiment, one terminal device may transmit one or more data streams. If the terminal device transmits one data stream, the M pilots are pilots of one data stream. If the terminal device transmits a plurality of data streams, the M pilots are pilots of the plurality of data streams, but a quantity of the pilots is greater than a quantity of the data streams.

In one embodiment, the pilot set may be a known pilot set.

In one embodiment, the network device may determine, based on current quality of a channel between the network device and the terminal device or a priority of the terminal device, whether the M pilots that are used to transmit the N data streams need to be determined in the pilot set.

In one embodiment, the sending, by the network device, first indication information to a terminal device includes: sending, by the network device, the first indication information to the terminal device by using radio resource control RRC signaling or downlink control information DCI.

According to an eighth aspect, a communications method is provided. The method includes: determining, by a terminal device in a pilot set, M pilots that are used to transmit N data streams, where M and N are positive integers, and M is greater than N; and communicating, by the terminal device, the N data streams to a network device by using the M pilots.

In this embodiment of this application, the terminal device may determine the M pilots for transmitting the N data streams, and a quantity of the pilots is greater than a quantity of the data streams, so that aggregation of the M pilots for transmitting the N data streams can improve data transmission reliability.

In one embodiment, the terminal device may determine, based on current channel quality or a priority of the terminal device, whether the M pilots that are used to transmit the N data streams need to be determined in the pilot set.

In one embodiment, the method further includes: receiving, by the terminal device, first indication information sent by the network device, where the first indication information is used to indicate the M pilots that are used to transmit the N data streams and that are in the pilot set; and the determining, by a terminal device in a pilot set, M pilots that are used to transmit N data streams includes: determining, by the terminal device, the M pilots in the pilot set according to the first indication information.

In one embodiment, the first indication information is further used to indicate correspondences between the N data streams and the M pilots; and the communicating, by the terminal device, the N data streams to a network device by using the M pilots includes: determining, by the terminal device, in the M pilots based on the correspondences, a pilot corresponding to each of the N data streams; and communicating, by the terminal device, each of the N data streams by using the pilot corresponding to each of the N data streams.

In one embodiment, the correspondences between the N data streams and the M pilots may be indicated by the network device to the terminal device by using the first indication information, or may be pre-agreed on in a protocol. This is not limited in this embodiment of this application.

In one embodiment, one terminal device may transmit one or more data streams. If the terminal device transmits one data stream, the M pilots are pilots of one data stream. If the terminal device transmits a plurality of data streams, the M pilots are pilots of the plurality of data streams, but a quantity of the pilots is greater than a quantity of the data streams.

In one embodiment, the receiving, by the terminal device, first indication information sent by the network device includes: receiving, by the terminal device, the first indication information that is sent by the network device by using radio resource control RRC signaling or downlink control information DCI.

According to a ninth aspect, a communications apparatus is provided. The apparatus is configured to perform the method according to any one of the first aspect or the possible embodiments of the first aspect. In one embodiment, the apparatus includes units configured to perform the method according to any one of the first aspect or the possible embodiments of the first aspect.

According to a tenth aspect, a communications apparatus is provided. The apparatus is configured to perform the method according to any one of the second aspect or the possible embodiments of the second aspect. In one embodiment, the apparatus includes units configured to perform the method according to any one of the second aspect or the possible embodiments of the second aspect.

According to an eleventh aspect, a communications apparatus is provided. The apparatus is configured to perform the method according to any one of the third aspect or the possible embodiments of the third aspect. In one embodiment, the apparatus includes units configured to perform the method according to any one of the third aspect or the possible embodiments of the third aspect.

According to a twelfth aspect, a communications apparatus is provided. The apparatus is configured to perform the method according to any one of the fourth aspect or the possible embodiments of the fourth aspect. In one embodiment, the apparatus includes units configured to perform the method according to any one of the fourth aspect or the possible embodiments of the fourth aspect.

According to a thirteenth aspect, a communications apparatus is provided. The apparatus is configured to perform the method according to any one of the fifth aspect or the possible embodiments of the fifth aspect. In one embodiment, the apparatus includes units configured to perform the method according to any one of the fifth aspect or the possible embodiments of the fifth aspect.

According to a fourteenth aspect, a communications apparatus is provided. The apparatus is configured to perform the method according to any one of the sixth aspect or the possible embodiments of the sixth aspect. In one embodiment, the apparatus includes units configured to perform the method according to any one of the sixth aspect or the possible embodiments of the sixth aspect.

According to a fifteenth aspect, a communications apparatus is provided. The apparatus is configured to perform the method according to any one of the seventh aspect or the possible embodiments of the seventh aspect. In one embodiment, the apparatus includes units configured to perform the method according to any one of the seventh aspect or the possible embodiments of the seventh aspect.

According to a sixteenth aspect, a communications apparatus is provided. The apparatus is configured to perform the method according to any one of the eighth aspect or the possible embodiments of the eighth aspect. In one embodiment, the apparatus includes units configured to perform the method according to any one of the eighth aspect or the possible embodiments of the eighth aspect.

According to a seventeenth aspect, a communications system is provided. The system includes the apparatus according to any one of the ninth aspect or the optional embodiments of the ninth aspect and the apparatus according to any one of the tenth aspect or the optional embodiments of the tenth aspect. In one embodiment, the system includes the apparatus according to any one of the eleventh aspect or the optional embodiments of the eleventh aspect and the apparatus according to any one of the twelfth aspect or the optional embodiments of the twelfth aspect. In one embodiment, the system includes the apparatus according to any one of the thirteenth aspect or the optional embodiments of the thirteenth aspect and the apparatus according to any one of the fourteenth aspect or the optional embodiments of the fourteenth aspect. In one embodiment, the system includes the apparatus according to any one of the fifteenth aspect or the optional embodiments of the fifteenth aspect and the apparatus according to any one of the sixteenth aspect or the optional embodiments of the sixteenth aspect.

According to an eighteenth aspect, a communications apparatus is provided. The apparatus includes a transceiver, a memory, and a processor. The transceiver, the memory, and the processor communicate with each other by using an internal connection path. The memory is configured to store an instruction. The processor is configured to execute the instruction stored in the memory, to control a receiver to receive a signal and control a transmitter to send a signal. In addition, when the processor executes the instruction stored in the memory, the execution enables the processor to perform the method according to any one of the first aspect or the possible embodiments of the first aspect.

According to a nineteenth aspect, a communications apparatus is provided. The apparatus includes a transceiver, a memory, and a processor. The transceiver, the memory, and the processor communicate with each other by using an internal connection path. The memory is configured to store an instruction. The processor is configured to execute the instruction stored in the memory, to control a receiver to receive a signal and control a transmitter to send a signal. In addition, when the processor executes the instruction stored in the memory, the execution enables the processor to perform the method according to any one of the second aspect or the possible embodiments of the second aspect.

According to a twentieth aspect, a communications apparatus is provided. The apparatus includes a transceiver, a memory, and a processor. The transceiver, the memory, and the processor communicate with each other by using an internal connection path. The memory is configured to store an instruction. The processor is configured to execute the instruction stored in the memory, to control a receiver to receive a signal and control a transmitter to send a signal. In addition, when the processor executes the instruction stored in the memory, the execution enables the processor to perform the method according to any one of the third aspect or the possible embodiments of the third aspect.

According to a twenty-first aspect, a communications apparatus is provided. The apparatus includes a transceiver, a memory, and a processor. The transceiver, the memory, and the processor communicate with each other by using an internal connection path. The memory is configured to store an instruction. The processor is configured to execute the instruction stored in the memory, to control a receiver to receive a signal and control a transmitter to send a signal. In addition, when the processor executes the instruction stored in the memory, the execution enables the processor to perform the method according to any one of the fourth aspect or the possible embodiments of the fourth aspect.

According to a twenty-second aspect, a communications apparatus is provided. The apparatus includes a transceiver, a memory, and a processor. The transceiver, the memory, and the processor communicate with each other by using an internal connection path. The memory is configured to store an instruction. The processor is configured to execute the instruction stored in the memory, to control a receiver to receive a signal and control a transmitter to send a signal. In addition, when the processor executes the instruction stored in the memory, the execution enables the processor to perform the method according to any one of the fifth aspect or the possible embodiments of the fifth aspect.

According to a twenty-third aspect, a communications apparatus is provided. The apparatus includes a transceiver, a memory, and a processor. The transceiver, the memory, and the processor communicate with each other by using an internal connection path. The memory is configured to store an instruction. The processor is configured to execute the instruction stored in the memory, to control a receiver to receive a signal and control a transmitter to send a signal. In addition, when the processor executes the instruction stored in the memory, the execution enables the processor to perform the method according to any one of the sixth aspect or the possible embodiments of the sixth aspect.

According to a twenty-fourth aspect, a communications apparatus is provided. The apparatus includes a transceiver, a memory, and a processor. The transceiver, the memory, and the processor communicate with each other by using an internal connection path. The memory is configured to store an instruction. The processor is configured to execute the instruction stored in the memory, to control a receiver to receive a signal and control a transmitter to send a signal. In addition, when the processor executes the instruction stored in the memory, the execution enables the processor to perform the method according to any one of the seventh aspect or the possible embodiments of the seventh aspect.

According to a twenty-fifth aspect, a communications apparatus is provided. The apparatus includes a transceiver, a memory, and a processor. The transceiver, the memory, and the processor communicate with each other by using an internal connection path. The memory is configured to store an instruction. The processor is configured to execute the instruction stored in the memory, to control a receiver to receive a signal and control a transmitter to send a signal. In addition, when the processor executes the instruction stored in the memory, the execution enables the processor to perform the method according to any one of the eighth aspect or the possible embodiments of the eighth aspect.

According to a twenty-sixth aspect, a computer-readable storage medium is provided. The computer-readable storage medium stores an instruction, and when the instruction is run on a computer, the computer is enabled to perform the method according to any one of the first aspect or the possible embodiments of the first aspect.

According to a twenty-seventh aspect, a computer-readable storage medium is provided. The computer-readable storage medium stores an instruction, and when the instruction is run on a computer, the computer is enabled to perform the method according to any one of the second aspect or the possible embodiments of the second aspect.

According to a twenty-eighth aspect, a computer-readable storage medium is provided. The computer-readable storage medium stores an instruction, and when the instruction is run on a computer, the computer is enabled to perform the method according to any one of the third aspect or the possible embodiments of the third aspect.

According to a twenty-ninth aspect, a computer-readable storage medium is provided. The computer-readable storage medium stores an instruction, and when the instruction is run on a computer, the computer is enabled to perform the method according to any one of the fourth aspect or the possible embodiments of the fourth aspect.

According to a thirtieth aspect, a computer-readable storage medium is provided. The computer-readable storage medium stores an instruction, and when the instruction is run on a computer, the computer is enabled to perform the method according to any one of the fifth aspect or the possible embodiments of the fifth aspect.

According to a thirty-first aspect, a computer-readable storage medium is provided. The computer-readable storage medium stores an instruction, and when the instruction is run on a computer, the computer is enabled to perform the method according to any one of the sixth aspect or the possible embodiments of the sixth aspect.

According to a thirty-second aspect, a computer-readable storage medium is provided. The computer-readable storage medium stores an instruction, and when the instruction is run on a computer, the computer is enabled to perform the method according to any one of the seventh aspect or the possible embodiments of the seventh aspect.

According to a thirty-third aspect, a computer-readable storage medium is provided. The computer-readable storage medium stores an instruction, and when the instruction is run on a computer, the computer is enabled to perform the method according to any one of the eighth aspect or the possible embodiments of the eighth aspect.

According to a thirty-fourth aspect, this application provides a computer program product including an instruction. When the computer program product is run on a computer, the computer is enabled to perform the method according to any one of the first aspect or the possible embodiments of the first aspect.

According to a thirty-fifth aspect, this application provides a computer program product including an instruction. When the computer program product is run on a computer, the computer is enabled to perform the method according to any one of the second aspect or the possible embodiments of the second aspect.

According to a thirty-sixth aspect, this application provides a computer program product including an instruction. When the computer program product is run on a computer, the computer is enabled to perform the method according to any one of the third aspect or the possible embodiments of the third aspect.

According to a thirty-seventh aspect, this application provides a computer program product including an instruction. When the computer program product is run on a computer, the computer is enabled to perform the method according to any one of the fourth aspect or the possible embodiments of the fourth aspect.

According to a thirty-eighth aspect, this application provides a computer program product including an instruction. When the computer program product is run on a computer, the computer is enabled to perform the method according to any one of the fifth aspect or the possible embodiments of the fifth aspect.

According to a thirty-ninth aspect, this application provides a computer program product including an instruction. When the computer program product is run on a computer, the computer is enabled to perform the method according to any one of the sixth aspect or the possible embodiments of the sixth aspect.

According to a fortieth aspect, this application provides a computer program product including an instruction. When the computer program product is run on a computer, the computer is enabled to perform the method according to any one of the seventh aspect or the possible embodiments of the seventh aspect.

According to a forty-first aspect, this application provides a computer program product including an instruction. When the computer program product is run on a computer, the computer is enabled to perform the method according to any one of the eighth aspect or the possible embodiments of the eighth aspect.

According to a forty-second aspect, this application provides a communications chip, storing an instruction. When the communications chip is run on a terminal device or a network device, the terminal device or the network device is enabled to perform the method according to any one of the foregoing aspects.

DESCRIPTIONS OF EMBODIMENTS

The following describes technical solutions in this application with reference to the accompanying drawings.

It should be understood that, the technical solutions in embodiments of this application may be applied to various communications systems, for example, a global system for mobile communications (GSM), a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, a wireless local area network (WLAN) system, or a future fifth generation wireless communications system (5G).

Figure 1:
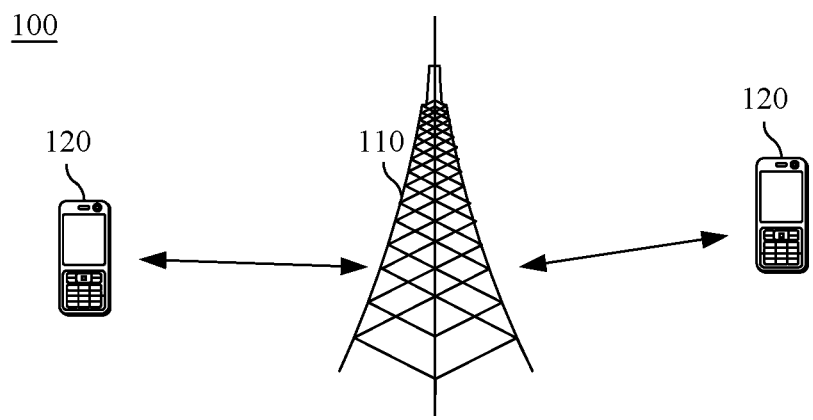
FIG. 1 is a schematic diagram of a communications system to which an embodiment of this application is applied.

FIG. 1 shows a communications system 100 to which an embodiment of this application is applied. The communications system 100 may include a terminal device 110 that may be referred to as an access terminal, a subscriber unit, a subscriber station, a mobile station, a mobile console, a remote station, a remote terminal, a mobile device, a user terminal, a terminal, a wireless communications device, a user agent, a user apparatus, or the like. The access terminal may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal in a 5G network, or the like.

A network device 120 may be a network side device that performs wireless communication with the terminal device, for example, a wireless fidelity (Wi-Fi) access point, or a base station in next generation communications, for example, a gNB, a small cell, a micro base station, or a transmission reception point (TRP) in 5G, or may be a base station in 2G, 3G, and 4G, or may be a relay station, an access point, a vehicle-mounted device, a wearable device, or the like.

The following explains terms used in the embodiments of this application:

Pilot or pilot signal: A pilot is generated by mapping a pilot sequence to a pilot pattern, and in one embodiment, the pilot is generated by using the pilot sequence and the pilot pattern. A fixed pilot corresponds to a fixed pilot sequence and a fixed pilot pattern. At least one of pilot sequences and pilot patterns represented by different pilots or pilot signals is different.

A pilot sequence is a string of values used to represent a pilot. The values belong to values in a complex number set. Cross-correlation between pilot sequences may decrease as a sequence length increases, and in one embodiment, a longer pilot sequence indicates less interference.

A time-frequency resource occupied by a pilot pattern, a pilot, or a pilot signal may also be referred to as a pilot pattern. A pilot pattern may represent arrangement of time-frequency resources used to send a pilot sequence, and pilot patterns of different densities represent different densities of time-frequency resources used to send pilot sequences in total resources. That densities of time-frequency resources occupied by pilot patterns are different may include: densities of time domain resources occupied by the pilot patterns are different, or include: densities of frequency domain resources occupied by the pilot patterns are different, or include: densities of time-frequency domain resources occupied by the pilot patterns are different. This is not limited in the embodiments of this application. A time domain density may be a ratio, to every n orthogonal frequency division multiplexing (CP-OFDM) symbols, of a quantity of OFDM symbols to which a pilot is mapped in the n OFDM symbols of a terminal device or a network device. A frequency domain density may be a ratio, to every q subcarriers, of a quantity of subcarriers to which a pilot is mapped in the q subcarriers, where n and q are integers greater than or equal to 1.

Pilot port: A specific pilot port corresponds to (is associated or bound with) a specific parameter that is used to generate a pilot sequence and a parameter that is used to determine a time-frequency resource for mapping the pilot sequence. The parameter that is used to generate the pilot sequence and that corresponds to the pilot port may be all parameters required to generate the pilot sequence, or may be some of all parameters required to generate the pilot sequence. The parameter that is used to determine the time-frequency resource for mapping the pilot sequence may be all parameters required to determine the time-frequency resource for mapping the pilot sequence, or some of all parameters required to determine the time-frequency resource for mapping the pilot sequence.

When the parameter that is used to generate the pilot sequence and that corresponds to the pilot port is some of all the parameters required to generate the pilot sequence, other parameters used to generate the pilot sequence may be obtained in other manners, for example, may be preconfigured by the network device, or may be specified in a standard (protocol), and does not need to be notified by the network device to the terminal device. For example, a cell identifier may be implicitly notified by the network device to the terminal device. A time domain resource sequence number does not need to be notified by the network device to the terminal device. A scrambling identifier or a non-orthogonal sequence identifier is semi-statically or dynamically configured by the network device for the terminal device. A user identifier may not need to be configured by the network device, or may be configured by the network device.

When the parameter that is used to determine the time-frequency resource for mapping the pilot sequence is some of all the parameters required to determine the time-frequency resource for mapping the pilot sequence, other parameters used to determine the time-frequency resource for mapping the pilot sequence may be obtained in other manners, for example, may be preconfigured by the network device, or may be specified in a standard (protocol), and does not need to be notified by the network device to the terminal device.

It should be understood that, in the embodiments of this application, a time-frequency resource corresponding to a pilot port may also be referred to as a time-frequency resource occupied by a pilot signal corresponding to the pilot port, and is a time-frequency resource used to map the pilot sequence. A pilot sequence corresponding to a pilot port may also be referred to as a pilot sequence of a pilot signal corresponding to the pilot port, and is a pilot sequence generated based on a parameter that is used to generate the pilot sequence and that corresponds to the pilot port.

In one embodiment, one pilot port is in a one-to-one correspondence with one antenna port, and different pilot ports correspond to different antenna ports. A parameter that is used to generate a pilot sequence and that corresponds to one pilot port and a parameter that is used to determine a time-frequency resource for mapping a pilot sequence and that corresponds to the pilot port may also be considered as a parameter that is used to generate a pilot sequence and that corresponds to an antenna port corresponding to the pilot port and a parameter that is used to determine a time-frequency resource for mapping a pilot sequence and that corresponds to the antenna port corresponding to the pilot port, and vice versa.

Code division multiplexing (CDM) group: A code division multiplexing group includes one or more pilot ports, and pilot ports in one code division multiplexing group corresponds to a same time-frequency resource. Pilot ports in one code division multiplexing group are code division orthogonal. In other words, pilot sequences corresponding to the pilot ports in the code division multiplexing group are orthogonal. Pilot resources corresponding to pilot ports in different code division multiplexing groups are different.

In one embodiment, a pilot port is a demodulation reference signal (DMRS) port. There are two types of DMRS configurations, including a configuration 1 and a configuration 2. Each configuration includes a single-symbol configuration and a dual-symbol configuration. In a same single-symbol configuration or dual-symbol configuration, pilot ports in a CDM group multiplex a same time-frequency resource in a CDM manner, for example, methods such as an orthogonal cover code (OCC), a cyclic shift (CS), or cyclic phase rotation. Time-frequency resources corresponding to pilot ports in CDM groups are orthogonal.

Figure 21:
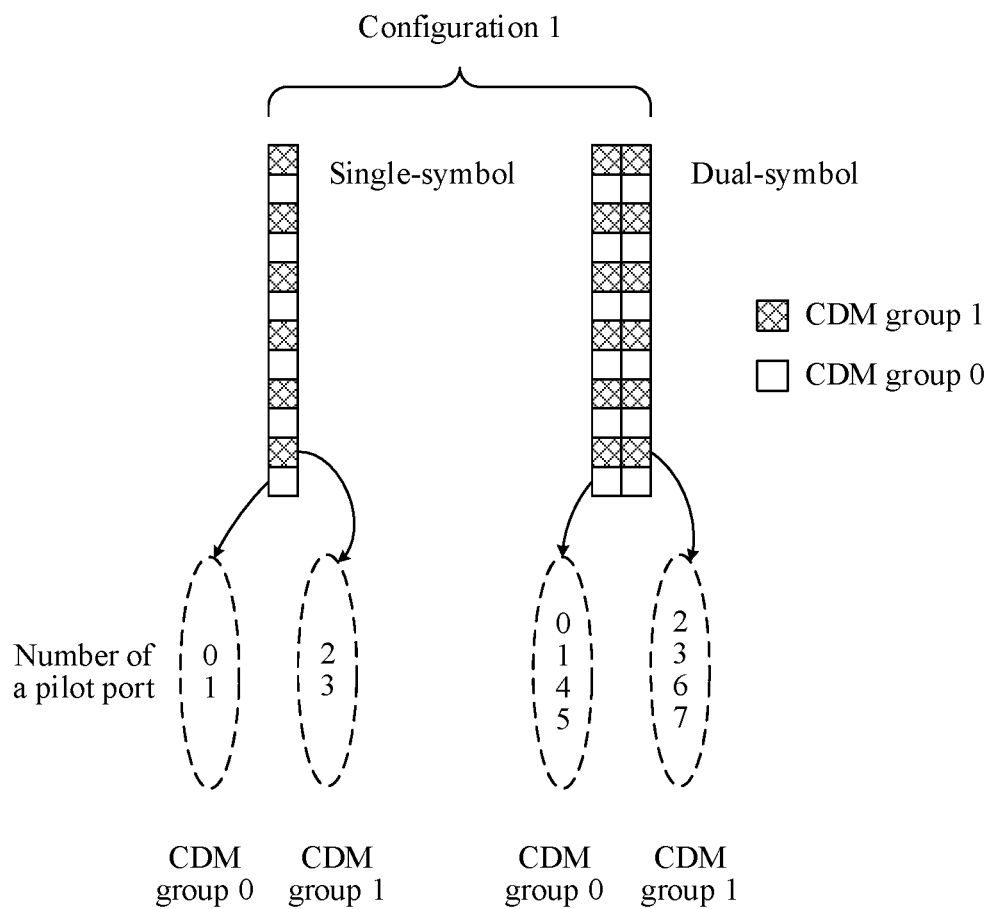
FIG. 21 is a schematic diagram of a CDM group according to an embodiment of this application.
Figure 22:
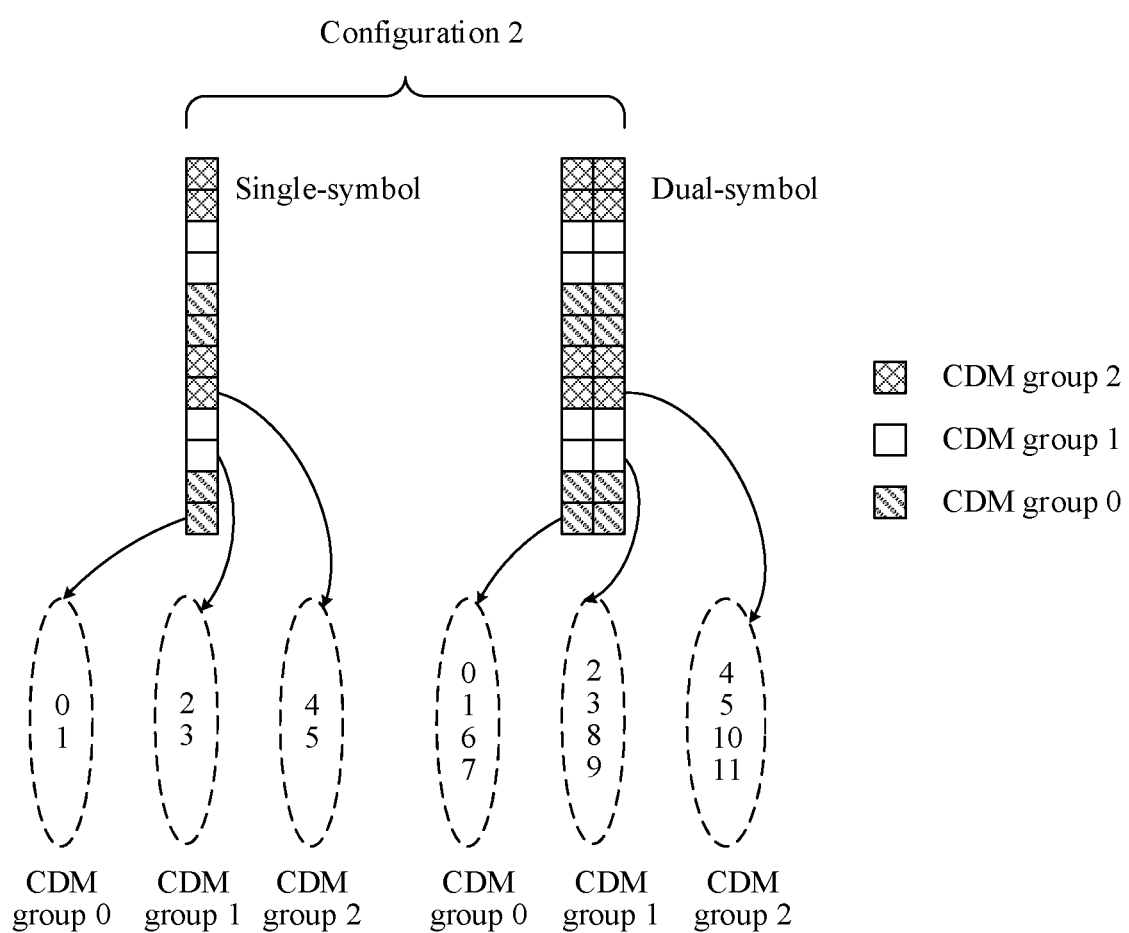
FIG. 22 is a schematic diagram of a pilot port configuration according to an embodiment of this application.

As shown in FIG. 21, the configuration manner 1 is divided into a single-symbol configuration and a dual-symbol configuration. In the single-symbol configuration, there may be two CDM groups (a CDM group 0 and a CDM group 1), and pilot ports in each CDM group multiplex a same time-frequency resource in a CDM manner. Numbers of pilot ports in the CDM group 0 are 0 and 1, and numbers of pilot ports in the CDM group 1 are 2 and 3. In one embodiment, a time-frequency resource corresponding to the pilot port 1 is the same as a time-frequency resource corresponding to the pilot port 2. A time-frequency resource corresponding to one of the pilot port 0 and the pilot port 1 is the same as a time-frequency resource corresponding to one of the pilot port 2 and the pilot port 3. In the dual-symbol configuration in the configuration 1, two CDM groups (a CDM group 0 and a CDM group 1) may be used. This is similar to the single-symbol configuration. Details are not described herein again. FIG. 22 shows a single-symbol configuration and a dual-symbol configuration in the configuration 2. This is similar to the descriptions in the configuration 1. Details are not described herein again.

In one embodiment, whether the network device and the terminal device configure a pilot port by using the configuration 1 or configure a pilot port by using the configuration 2 may be indicated by the network device to the terminal device. Further, whether the network device and the terminal device configure a pilot port in the single-symbol configuration manner or the dual-symbol configuration manner in the configuration 1 or the configuration 2 may be indicated by the network device to the terminal device in advance.

A pilot port set may be a set of all pilot ports, or may be a set obtained after all pilot ports are grouped. For example, as described above, the pilot port set may be a DMRS port group, and the DMRS port group may be referred to as a CDM group. This is not limited in the embodiments of this application.

As different application scenarios may appear in a future network system, and there are different requirements for pilot ports in the different application scenarios, if a terminal or a network performs communication by using a specific pilot port, diversified requirements in the future network system cannot be met. For example, in a URLLC scenario, low-latency and high-reliability transmission is required; therefore, high-density pilot ports are required to perform channel estimation. If existing pilot ports are used to perform channel estimation, channel estimation performance is relatively poor. Consequently, data transmission reliability is not high. If user detection is performed by using an existing pilot port when the user detection is performed based on a pilot, user detection performance is not high. Therefore, in the embodiments of this application, pilot ports may be aggregated, thereby improving data transmission reliability.

Figure 2:
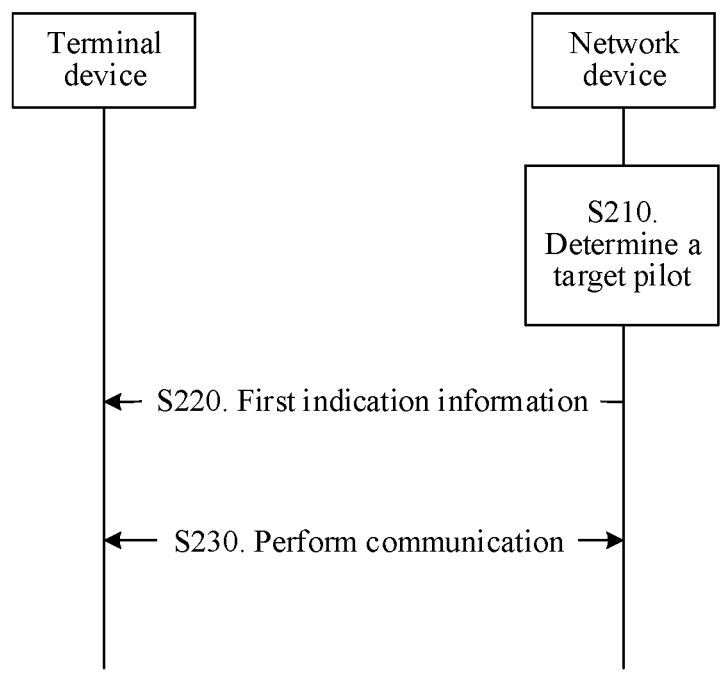
FIG. 2 is a schematic diagram of a communications method according to an embodiment of this application.

FIG. 2 shows a communications method 200 according to an embodiment of this application. The method 200 may be applied to the communications system 100 shown in FIG. 1. However, this embodiment of this application is not limited thereto.

S210. A network device determines a target pilot in a pilot set, where the pilot set includes at least a first pilot and a second pilot, and a time-frequency resource occupied by the first pilot partially overlaps a time-frequency resource occupied by the second pilot.

In one embodiment, the time-frequency resource occupied by the first pilot may include all of the time-frequency resource occupied by the second pilot. For example, the time-frequency resource occupied by the first pilot is shown in the first pilot pattern in FIG. 5, and the time-frequency resource occupied by the second pilot is shown in the first pilot pattern in FIG. 3, and a part of the time-frequency resource occupied by the first pilot is the same as a part of the time-frequency resource occupied by the second pilot. For example, the time-frequency resource occupied by the first pilot is shown in the first pilot pattern in FIG. 5, and the time-frequency resource occupied by the second pilot is shown in the second pilot pattern in FIG. 5. It should be understood that, that A and B partially overlap includes the following three cases: A includes all of B; B includes all of A; or a part of A is the same as a part of B.

Figure 3:
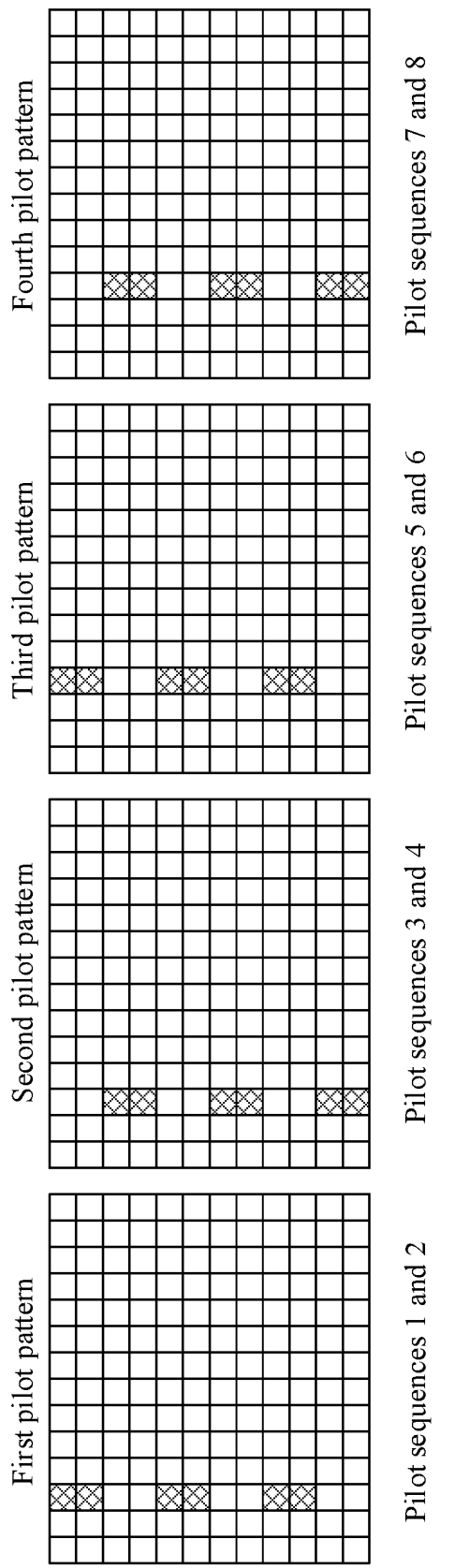
FIG. 3 is a schematic diagram of pilot patterns according to an embodiment of this application.

In one embodiment, a density of the time-frequency resource occupied by the first pilot is different from a density of the time-frequency resource occupied by the second pilot. For example, the time-frequency resource occupied by the first pilot is shown in any pilot pattern in FIG. 3, and the time-frequency resource occupied by the second pilot is shown in any pilot pattern in FIG. 5. In one embodiment, a density of a time-frequency resource in any pilot pattern in FIG. 3 is different from a density of a time-frequency resource in any pilot pattern in FIG. 5.

In one embodiment, each pilot in the pilot set is generated by using a pilot sequence and a pilot pattern, and in one embodiment, the target pilot is generated by using a target pilot sequence and a target pilot pattern.

In one embodiment, a high-density pilot pattern in the pilot set may be a union set of a plurality of low-density pilot patterns. For example, a pilot pattern in which a density of a time-frequency resource occupied by a pilot is greater than a first threshold may be referred to as a high-density pilot pattern, and a pilot pattern in which a density of a time-frequency resource occupied by a pilot is less than the first threshold may be referred to as a low-density pilot pattern.

Figure 4:
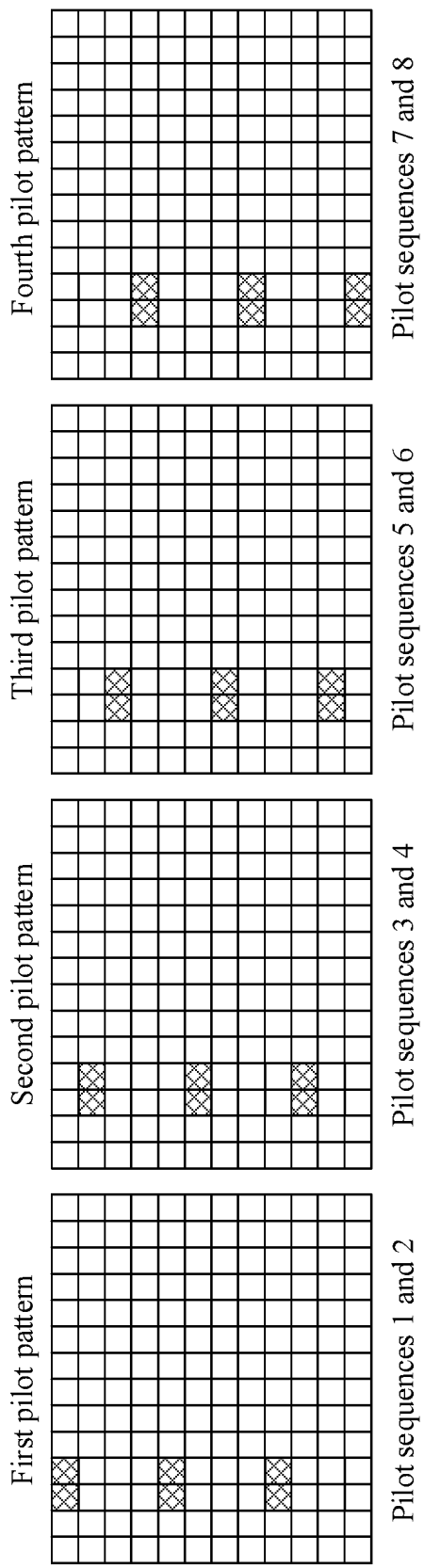
FIG. 4 is another schematic diagram of pilot patterns according to an embodiment of this application.

In one embodiment, the time-frequency resource occupied by the first pilot is a union set of the time-frequency resource occupied by the second pilot and a time-frequency resource occupied by a third pilot in the pilot set. In one embodiment, time-frequency resources occupied by some pilots in the pilot set include time-frequency resources occupied by the other pilots. The first pilot, the second pilot, or the third pilot may be a specific pilot in the pilot set. In an embodiment, the time-frequency resource occupied by the second pilot and the time-frequency resource occupied by the third pilot at least do not coincide completely, and further, may not coincide at all. For example, as shown in FIG. 3, the time-frequency resources occupied by the second pilot and the third pilot may be shown in any one of four pilot patterns shown in FIG. 3. In the first pilot pattern, two different pilot sequences may be mapped in a code division manner, and it is assumed that a pilot sequence 1 and a pilot sequence 2 may be mapped to the first pilot pattern. In the second pilot pattern, two different pilot sequences may be mapped in a code division manner, and it is assumed that a pilot sequence 3 and a pilot sequence 4 may be mapped to the second pilot pattern. In the third pilot pattern, two different pilot sequences may be mapped in a code division manner, and it is assumed that a pilot sequence 5 and a pilot sequence 6 may be mapped to the third pilot pattern. In the fourth pilot pattern, two different pilot sequences may be mapped in a code division manner, and it is assumed that a pilot sequence 7 and a pilot sequence 8 may be mapped to the fourth pilot pattern. Certainly, the time-frequency resources occupied by the second pilot and the third pilot may be shown in any one of four different pilot patterns in which resources are code divided in time domain. It should be understood that, the time-frequency resource occupied by the first pilot may be a union set of at least two of the four pilot patterns in FIG. 3, or the time-frequency resource occupied by the first pilot may be a union set of at least two of the four pilot patterns in FIG. 4. Certainly, the time-frequency resource occupied by the first pilot may alternatively be a union set of at least two other pilot patterns. This is not limited in this embodiment of this application.

In one embodiment, a set including the second pilot, the third pilot, and the like may be referred to as a basic pilot set. In one embodiment, time-frequency resources occupied by pilot patterns corresponding to pilots in the basic pilot set have a same density, but do not overlap each other. For example, time-frequency resources occupied by the pilot patterns in FIG. 3 and FIG. 4 have a same density, but do not overlap each other. Certainly, the time-frequency resources occupied by the pilot patterns corresponding to the pilots in the basic pilot set may alternatively be different. For example, a pilot pattern formed by combining the pilot patterns in FIG. 3 and FIG. 5 may be used as a pilot pattern set of the basic pilot set. This is not limited in this embodiment of this application.

Figure 6:
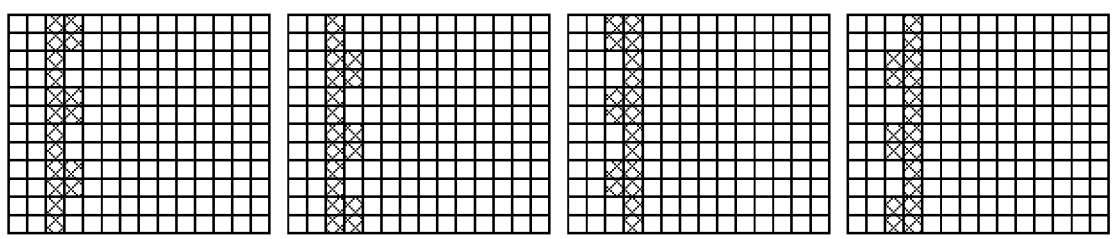
FIG. 6 is still another schematic diagram of pilot patterns according to an embodiment of this application.
Figure 7:
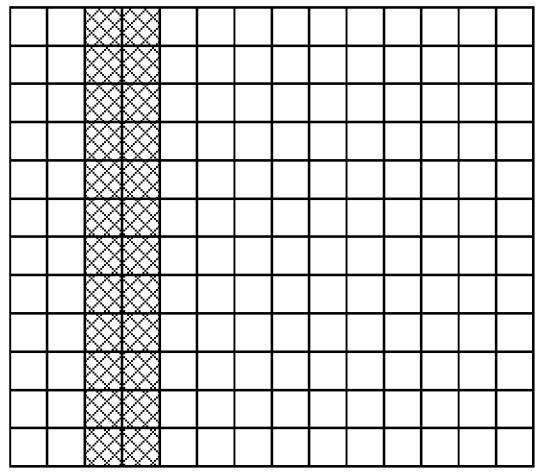
FIG. 7 is still another schematic diagram of a pilot pattern according to an embodiment of this application.
Figure 8:
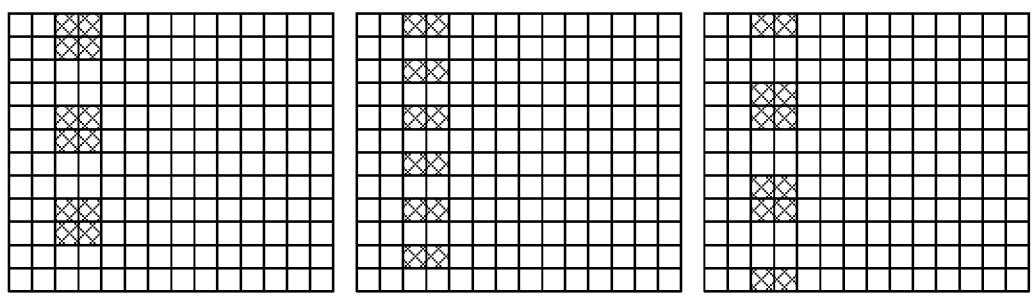
FIG. 8 is still another schematic diagram of pilot patterns according to an embodiment of this application.
Figure 8:
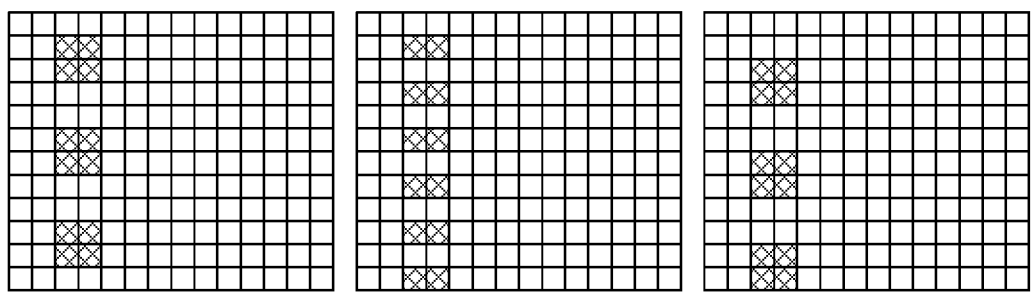
Figure 9:
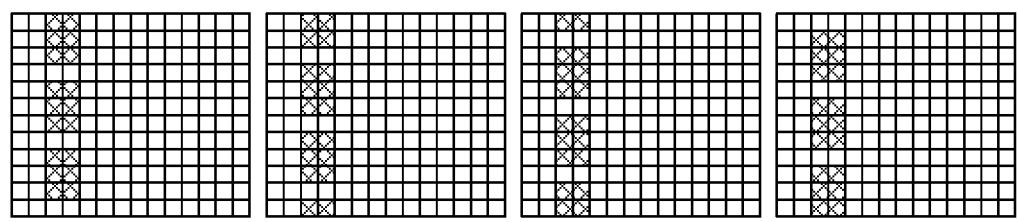
FIG. 9 is still another schematic diagram of pilot patterns according to an embodiment of this application.

In one embodiment, the time-frequency resource occupied by the first pilot is a union set of the time-frequency resource occupied by the second pilot and the time-frequency resource occupied by the third pilot in the pilot set. For example, it is assumed that six pilot patterns in FIG. 5 may be generated by selecting any two pilot patterns from the four pilot patterns in FIG. 3. It is assumed that four pilot patterns in FIG. 6 may be generated by selecting any three pilot patterns from the four pilot patterns in FIG. 3. It is assumed that one pilot pattern in FIG. 7 may be generated by selecting all the four pilot patterns in FIG. 3. A pilot pattern in the pilot set may be a pilot pattern in at least one of FIG. 3, and FIG. 5 to FIG. 7, or the pilot set may be a pilot pattern in at least one of FIG. 5 to FIG. 7. For another example, it is assumed that six pilot patterns in FIG. 8 may be generated by selecting any two pilot patterns from the four pilot patterns in FIG. 4. It is assumed that four pilot patterns in FIG. 9 may be generated by selecting any three pilot patterns from the four pilot patterns in FIG. 4. It is assumed that one pilot pattern in FIG. 7 may be generated by selecting all the four pilot patterns in FIG. 4. A pilot pattern corresponding to a pilot in the pilot set may be a pilot pattern in at least one of FIG. 4, and FIG. 7 to FIG. 9, or the pilot set may be a pilot pattern in at least one of FIG. 7 to FIG. 9.

In one embodiment, a pilot sequence corresponding to a pilot in the pilot set may be generated in the following four manners:

In the first manner, a part of a pilot sequence corresponding to the first pilot is the same as at least a part of a pilot sequence corresponding to the second pilot. In other words, the pilot sequence corresponding to the first pilot includes all of the pilot sequence corresponding to the second pilot, or a part of the pilot sequence corresponding to the first pilot is the same as a part of the pilot sequence corresponding to the second pilot. In one embodiment, pilot sequences corresponding to some pilots in the pilot set may be generated by using pilot sequences corresponding to the other pilots in the pilot set, or pilot sequences corresponding to some pilots in the pilot set partially overlap pilot sequences corresponding to the other pilots. It should be understood that, that a part of A is the same as at least a part of B includes: A includes all of B, or a part of A is the same as a part of B. A length of the pilot sequence of the first pilot is greater than a length of the pilot sequence of the second pilot, and a longer pilot sequence indicates less interference between terminal devices. For example, the pilot sequence corresponding to the first pilot in the pilot set is generated by crossing the pilot sequence corresponding to the second pilot in the pilot set and a pilot sequence corresponding to the third pilot in the pilot set. It is assumed that, in FIG. 3, the pilot sequence 1 and the pilot sequence 2 that are mapped to the first pilot pattern are respectively:

the pilot sequence 1=(p1(1), p1(2), p1(3), p1(4), p1(5), p1(6)); and the pilot sequence 2=(p2(1), p2(2), p2(3), p2(4), p2(5), p2(6)).

The pilot sequence 3 and the pilot sequence 4 that are mapped to the second pilot pattern are respectively:

the pilot sequence 3=(p3(1), p3(2), p3(3), p3(4), p3(5), p3(6)); and the pilot sequence 4=(p4(1), p4(2), p4(3), p4(4), p4(5), p4(6)).

pi(j) represents a value of a sequence in the pilot sequence. For example, the pilot sequence 1=(p1(1), p1(2), p1(3), p1(4), p1(5), p1(6)) represents that the pilot sequence 1 is a sequence obtained by sequentially combining values of p1(1), p1(2), p1(3), p1(4), p1(5), and p1(6).

Figure 5:
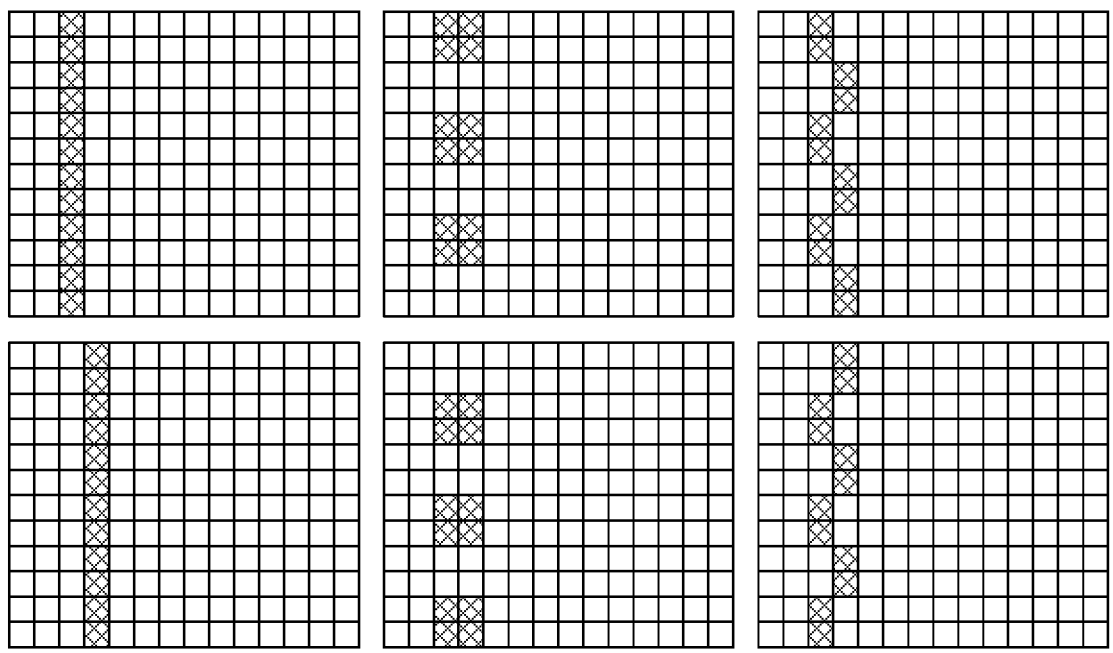
FIG. 5 is still another schematic diagram of pilot patterns according to an embodiment of this application.

The first pilot pattern shown in FIG. 5 is generated based on a union set of the first pilot pattern and the second pilot pattern shown in FIG. 3, which is also referred to as splicing. In this case, a pilot sequence that may be mapped to the first pilot pattern shown in FIG. 5 may be a crossed combination of the pilot sequences (the pilot sequence 1 and the pilot sequence 2) corresponding to the first pilot pattern and the pilot sequences (the pilot sequence 3 and the pilot sequence 4) corresponding to the second pilot pattern (and in one embodiment, different pilot sequences corresponding to a same pilot pattern cannot be combined, and pilot sequences corresponding to different pilot patterns are combined). After the crossed combination, the following may be obtained:

a pilot sequence 9=the pilot sequence 1+the pilot sequence 3=(p1(1), p1(2), P3(1), p3(2), p1(3), p1(4), p3(3), p3(4), p1(5), p1(6), p3(5), p3(6));

a pilot sequence 10=the pilot sequence 1+the pilot sequence 4=(p1(1), p1(2), p4(1), p4(2), p1(3), p1(4), p4(3), p4(4), p1(5), p1(6), p4(5), p4(6));

a pilot sequence 11=the pilot sequence 2+the pilot sequence 3=(p2(1), p2(2), p3(1), p3(2), p2(3), p2(4), p3(3), p3(4), p2(5), p2(6), p3(5), p3(6)); and a pilot sequence 12=the pilot sequence 2+the pilot sequence 4=(p2(1), p2(2), p4(1), p4(2), p2(3), p2(4), p4(3), p4(4), p2(5), p2(6), p4(5), p4(6)).

In one embodiment, in the foregoing example, at least one of the pilot sequence 1, the pilot sequence 2, the pilot sequence 3, and the pilot sequence 4 may be referred to as the pilot sequence corresponding to the second pilot, and at least one of the pilot sequence 9, the pilot sequence 10, the pilot sequence 11, and the pilot sequence 12 may be referred to as the pilot sequence corresponding to the first pilot. The pilot sequence 9, the pilot sequence 10, the pilot sequence 11, and the pilot sequence 12 may be mapped to the first pattern in FIG. 5. Certainly, a manner of crossing the foregoing sequences is not limited. For example, the pilot sequence 9 may alternatively be: the pilot sequence 1+the pilot sequence 3=(p1(1), p3(1), p1(2), p3(2), p1(3), p3(3), p1(4), p3(4), p1(5), p3(5), p1(6), p3(6)). The crossing manner may be specified in a protocol, or the network device may configure the crossing manner. This is not limited in this embodiment of this application.

In the second manner, a pilot sequence corresponding to a pilot in the pilot set is generated based on cyclic shifts of pilot sequences corresponding to at least two pilots in the pilot set. For example, the pilot sequence 9, the pilot sequence 10, the pilot sequence 11, or the pilot sequence 12 is cyclically shifted to generate the pilot sequence corresponding to the first pilot. For another example, the pilot sequence 1 and the pilot sequence 2 are spliced and then cyclically shifted to generate the pilot sequence corresponding to the first pilot.

In the third manner, a pilot sequence corresponding to a pilot in the pilot set is generated based on a pseudo noise (Pseudo-noise, PN) sequence. For example, sequences generated by using different initial values may be pilot sequences corresponding to different pilots in the pilot set.

In the fourth manner, a pilot sequence corresponding to a pilot in the pilot set is generated based on a ZC (Zadoff-Chu) sequence. For example, sequences generated by using different roots may be pilot sequences corresponding to different pilots in the pilot set.

In one embodiment, S210 includes: determining, by the network device, the target pilot in the pilot set based on channel quality or a priority of the terminal device. For example, when the channel quality is relatively poor, the network device may select a pilot corresponding to a pilot pattern with a relatively high density from the pilot set, as the target pilot. Channel estimation accuracy can be improved by using the pilot corresponding to the pilot pattern with the relatively high density as the target pilot. When the channel quality is relatively good, the network device may select a pilot corresponding to a pilot pattern with a relatively low density from the pilot set, as the target pilot. When the priority of the terminal device is relatively high, the network device may select a pilot corresponding to a pilot pattern with a relatively high density from the pilot set, as the target pilot. When the priority of the terminal device is relatively low, the network device may select a pilot corresponding to a pilot pattern with a relatively low density from the pilot set, as the target pilot. For example, a terminal device corresponding to a URLLC type may select a pilot corresponding to a pilot pattern with a relatively high density, as the target pilot. Certainly, the network device may alternatively determine the target pilot in the pilot set based on a current resource status. When there are a relatively large quantity of idle resources, a pilot corresponding to a pilot pattern with a relatively high density may be selected as the target pilot. When there are insufficient resources, a pilot corresponding to a pilot pattern with a relatively low density may be selected as the target pilot.

S220. The network device sends first indication information to the terminal device, where the first indication information is used to indicate the target pilot in the pilot set. In one embodiment, the first indication information is used to indicate a number of the target pilot in the pilot set.

In one embodiment, S220 includes: sending, by the network device, the first indication information to the terminal device by using radio resource control (radio resource control, RRC) signaling or downlink control information (downlink control information, DCI).

In one embodiment, a related field for the first indication information may be set in the DCI. For example, the first indication information is represented by using an n-bit field, different values of n bits may indicate different pilots, different pilots may correspond to different terminal devices, and the terminal device may find, based on mapping relationships between the n bits and the pilots, a pilot corresponding to the terminal device. For example, n is 2, and each of four terminal devices stores a mapping table. When bits of a related field for the first indication information in the mapping table are 00, it indicates that the corresponding pilot is a pilot 1; when bits of a related field for the first indication information are 01, it indicates that the corresponding pilot is a pilot 2; when bits of a related field for the first indication information are 10, it indicates that the corresponding pilot is a pilot 3; or when bits of a related field for the first indication information are 11, it indicates that the corresponding pilot is a pilot 4. When receiving the DCI, the terminal device parses the related field for the first indication information, and determines the pilot 1 as the target pilot when parsing 00, determines the pilot 2 as the target pilot when parsing 01, determines the pilot 3 as the target pilot when parsing 10, or determines the pilot 4 as the target pilot when parsing 11. In this way, signaling overheads of the first indication information in the DCI can be reduced.

S230. The network device communicates with the terminal device by using the target pilot.

In one embodiment, S230 includes: sending, by the network device, downlink data and the target pilot to the terminal device; performing, by the terminal device, downlink channel estimation based on the received target pilot; and then receiving, by the terminal device, the downlink data based on a downlink channel estimation result.

In one embodiment, S230 further includes: receiving, by the network device, the target pilot that is sent by the terminal device when the terminal device sends uplink data; performing, by the network device, uplink channel estimation based on the target pilot; and then receiving, by the network device, the uplink data based on an uplink channel estimation result.

Therefore, according to the communications method provided in this embodiment of this application, the network device may determine the target pilot in the pilot set, and the time-frequency resources occupied by the pilots in the pilot set may overlap, and in one embodiment, time-frequency resources occupied by at least two pilots in the pilot set may include some common time-frequency resources. The pilots included in the pilot set may occupy some different time-frequency resources and some same time-frequency resources. In this way, diversified pilots in the pilot set can meet requirements for pilots in different application scenarios. Further, the time-frequency resources occupied by the at least two pilots in the pilot set have different densities. For a terminal device with a high priority, a pilot of a high-density time-frequency resource is selected as the target pilot, and for a terminal device with a low priority, a pilot of a low-density time-frequency resource is selected as the target pilot. In this way, different requirements of different terminal devices for pilots can be met, thereby improving data transmission reliability. In a case of relatively good channel quality, a pilot of a low-density time-frequency resource is selected as the target pilot. In a case of relatively poor channel quality, a pilot of a high-density time-frequency resource is selected as the target pilot. In this way, different pilots are selected based on different channel quality conditions, thereby improving pilot selection flexibility and improving resource utilization. A pilot of a low-density time-frequency resource is selected as the target pilot in a status in which there is a resource congestion, and a pilot of a high-density time-frequency resource is selected as the target pilot in a status in which there are sufficient resources. In this way, different pilots may be selected based on different resource statuses, thereby improving pilot selection flexibility and improving resource utilization.

Figure 10:
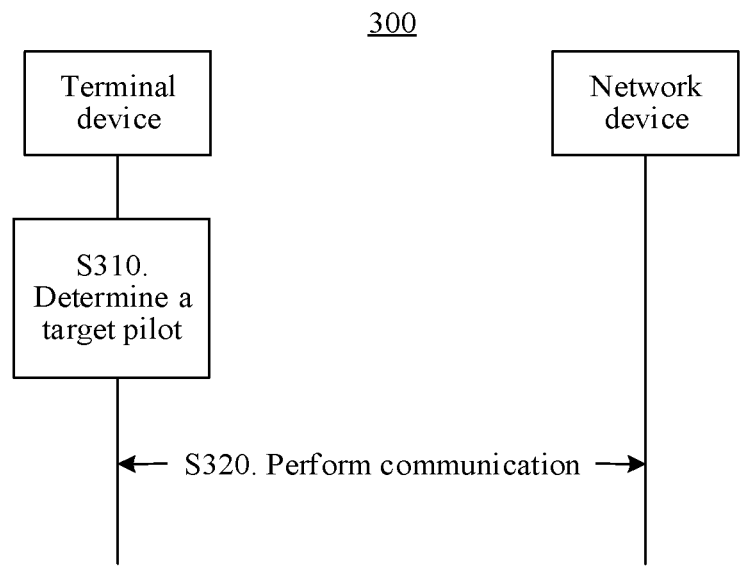
FIG. 10 is a schematic diagram of another communications method according to an embodiment of this application.

FIG. 10 shows a communications method 300 according to an embodiment of this application. The method 300 may be applied to the communications system 100 shown in FIG. 1. However, this embodiment of this application is not limited thereto.

S310. A terminal device determines a target pilot in a pilot set, where the pilot set includes at least a first pilot and a second pilot, and a time-frequency resource occupied by the first pilot partially overlaps a time-frequency resource occupied by the second pilot.

In one embodiment, a density of the time-frequency resource occupied by the first pilot is different from a density of the time-frequency resource occupied by the second pilot.

In one embodiment, the time-frequency resource occupied by the first pilot is a union set of the time-frequency resource occupied by the second pilot and a time-frequency resource occupied by a third pilot in the pilot set.

In one embodiment, a part of a pilot sequence corresponding to the first pilot is the same as at least a part of a pilot sequence corresponding to the second pilot.

It should be understood that, a feature of the pilot in the pilot set is the same as a feature of the pilot in the pilot set in the method 200. To avoid repetition, details are not described herein again.

In one embodiment, S310 includes: determining, by the terminal device, the target pilot in the pilot set based on channel quality or a priority of the terminal device. For example, when the channel quality is relatively poor, the terminal device may select a pilot corresponding to a pilot pattern with a relatively high density from the pilot set, as the target pilot. When the channel quality is relatively good, the terminal device may select a pilot corresponding to a pilot pattern with a relatively low density from the pilot set, as the target pilot. When the priority of the terminal device is relatively high, the network device may select a pilot corresponding to a pilot pattern with a relatively high density from the pilot set, as the target pilot. When the priority of the terminal device is relatively low, the network device may select a pilot corresponding to a pilot pattern with a relatively low density from the pilot set, as the target pilot. For example, a terminal device corresponding to a URLLC type may select a pilot corresponding to a pilot pattern with a relatively high density, as the target pilot. Certainly, the terminal device may alternatively determine the target pilot in the pilot set based on a current resource status. When there are a relatively large quantity of idle resources, a pilot corresponding to a pilot pattern with a relatively high density may be selected as the target pilot. When there are insufficient resources, a pilot corresponding to a pilot pattern with a relatively low density may be selected as the target pilot.

In one embodiment, S310 may be implemented in a non-grant free mode. In one embodiment, the method 300 further includes: receiving, by the terminal device, first indication information sent by the network device, where the first indication information is used to indicate the target pilot in the pilot set; and S310 includes: determining, by the terminal device, the target pilot in the pilot set according to the first indication information. In one embodiment, the receiving, by the terminal device, first indication information sent by the network device includes: receiving, by the terminal device, the first indication information that is sent by the network device by using RRC signaling or DCI.

In one embodiment, S310 may be implemented in a grant free (Grant Free) mode. In one embodiment, the terminal device may select a pilot from the pilot set, as the target pilot, the terminal device sends the target pilot to the network device, and the network device obtains the target pilot through blind detection, and then performs uplink channel estimation.

S320. The terminal device communicates with the network device by using the target pilot.

In one embodiment, S320 includes: receiving, by the terminal device, the target pilot sent by the network device; performing, by the terminal device, downlink channel estimation based on the target pilot; and then receiving, by the terminal device, downlink data based on a downlink channel estimation result.

In one embodiment, S320 further includes: sending, by the terminal device, uplink data and the target pilot to the network device; performing, by the network device, uplink channel estimation based on the target pilot; and then receiving, by the network device, uplink data based on an uplink channel estimation result.

Figure 11:
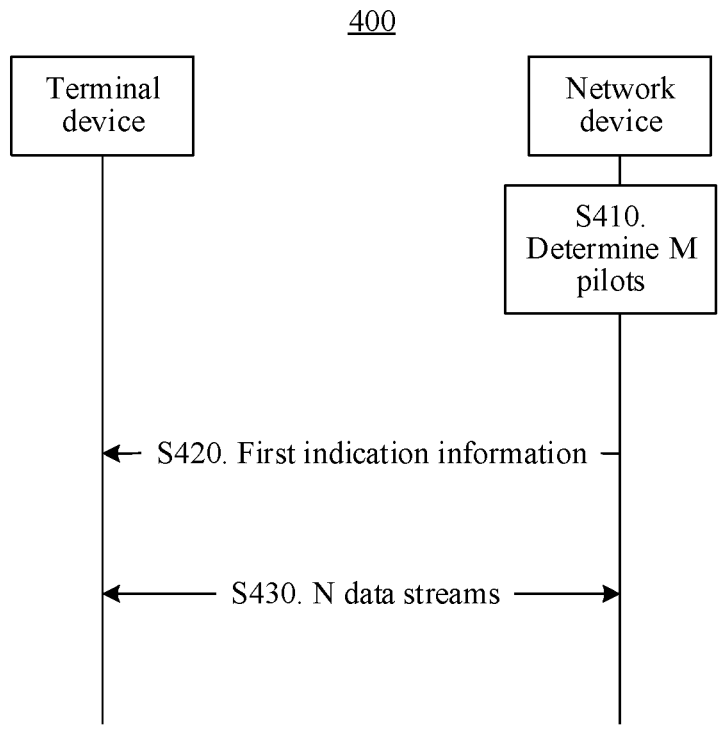
FIG. 11 is a schematic diagram of still another communications method according to an embodiment of this application.

FIG. 11 shows a communications method 400 according to an embodiment of this application. The method 400 may be applied to the communications system 100 shown in FIG. 1. However, this embodiment of this application is not limited thereto.

S410. A network device determines, in a pilot set, M pilots that are used to transmit N data streams, where M and N are positive integers, and M is greater than N.

In one embodiment, the network device may determine, based on current channel quality or a priority of the terminal device, whether the M pilots that are used to transmit the N data streams need to be determined in the pilot set. In one embodiment, when the channel quality is relatively poor or the priority of the terminal device is relatively high, the network device determines, in the pilot set, the M pilots that are used to transmit the N data streams, and in one embodiment, at least one data stream corresponds to a plurality of pilots. Pilot aggregation is performed by using the M pilots, to improve accuracy of channel estimation, tracking, measurement, and the like. When the channel quality is relatively good or the priority of the terminal device is relatively low, the network device determines, in the pilot set, N pilots that are used to transmit the N data streams. In one embodiment, one pilot corresponds to one data stream.

In one embodiment, the pilot set may be the basic pilot set in the method 200. For example, the pilot set may be a set including the pilots corresponding to the pilot pattern in FIG. 3; the pilot set may be a set including the pilots corresponding to the pilot pattern in FIG. 4; the pilot set may be a set including the pilots corresponding to the pilot pattern in any one of FIG. 3 and FIG. 5 to FIG. 7; or the pilot set may be a set including the pilots corresponding to the pilot pattern in any one of FIG. 4 and FIG. 7 to FIG. 9.

S420. The network device sends first indication information to the terminal device, where the first indication information is used to indicate the M pilots in the pilot set.

In one embodiment, S420 includes: sending, by the network device, the first indication information to the terminal device by using radio resource control RRC signaling or downlink control information DCI.

In one embodiment, the first indication information is further used to indicate correspondences between the N data streams and the M pilots.

In one embodiment, the correspondences between the N data streams and the M pilots may alternatively be correspondences specified in a protocol. This is not limited in this embodiment of this application.

In one embodiment, one terminal device may transmit one or more data streams. If the terminal device transmits one data stream, the M pilots are pilots of one data stream. If the terminal device transmits a plurality of data streams, the M pilots are pilots of the plurality of data streams, but a quantity of the pilots is greater than a quantity of the data streams.

S430. The network device communicates the N data streams to the terminal device by using the M pilots.

In one embodiment, S430 includes: sending, by the network device, N downlink data streams and the M pilots to the terminal device; performing, by the terminal device, downlink channel estimation based on the received M pilots; and then receiving, by the terminal device, the N downlink data streams based on a downlink channel estimation result.

In one embodiment, S430 further includes: receiving, by the network device, the M pilots that are sent by the terminal device when the terminal device sends N uplink data streams; performing, by the network device, uplink channel estimation based on the M pilots; and then receiving, by the network device, the N uplink data streams based on an uplink channel estimation result.

Therefore, according to the communications method provided in this embodiment of this application, the network device may determine the M pilots for transmitting the N data streams, where a quantity of the pilots is greater than a quantity of the data streams. Pilot aggregation is implemented by using the plurality of pilots, to improve accuracy of channel estimation, measurement, tracking, and the like. In addition, further, the network device may determine a quantity of used pilots based on the channel quality or the priority of the terminal device. A higher priority indicates more aggregated pilots, or poorer channel quality indicates more aggregated pilots. In this way, different quantities of pilots may be selected for different cases, thereby improving pilot transmission flexibility.

Figure 12:
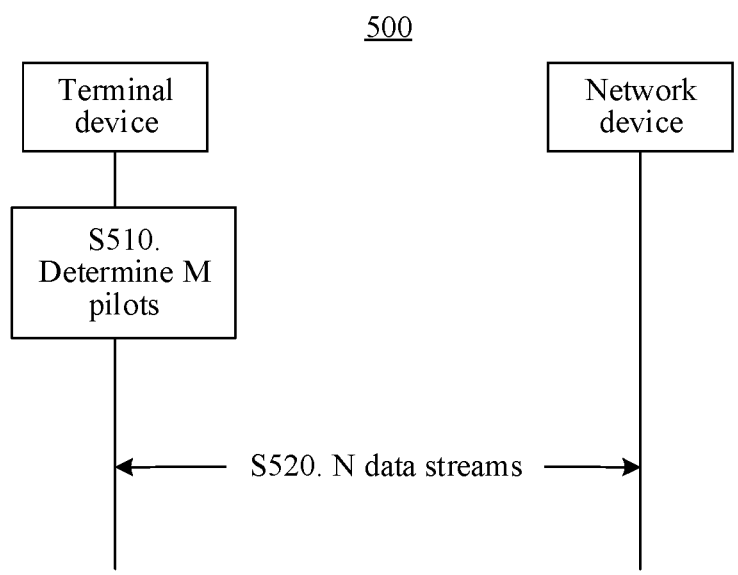
FIG. 12 is a schematic diagram of still another communications method according to an embodiment of this application.

FIG. 12 shows a communications method 500 according to an embodiment of this application. The method 500 may be applied to the communications system 100 shown in FIG. 1. However, this embodiment of this application is not limited thereto.

S510. A terminal device determines, in a pilot set, M pilots that are used to transmit N data streams, where M and N are positive integers, and M is greater than N.

In one embodiment, the terminal device may determine, based on current channel quality or a priority of the terminal device, whether the M pilots that are used to transmit the N data streams need to be determined in the pilot set. In one embodiment, when the channel quality is relatively poor or the priority of the terminal device is relatively high, the terminal device determines, in the pilot set, the M pilots that are used to transmit the N data streams, and in one embodiment, at least one data stream corresponds to a plurality of pilots. Pilot aggregation is performed by using the M pilots, to improve accuracy of channel estimation, tracking, measurement, and the like. When the channel quality is relatively good or the priority of the terminal device is relatively low, the terminal device determines, in the pilot set, N pilots that are used to transmit the N data streams. In one embodiment, one pilot corresponds to one data stream.

In one embodiment, the pilot set may be the basic pilot set in the method 200. For example, the pilot set may be a set including the pilots corresponding to the pilot pattern in FIG. 3; the pilot set may be a set including the pilots corresponding to the pilot pattern in FIG. 4; the pilot set may be a set including the pilots corresponding to the pilot pattern in any one of FIG. 3 and FIG. 5 to FIG. 7; or the pilot set may be a set including the pilots corresponding to the pilot pattern in any one of FIG. 4 and FIG. 7 to FIG. 9.

In one embodiment, the method 500 further includes: receiving, by the terminal device, first indication information sent by the network device, where the first indication information is used to indicate the M pilots that are used to transmit the N data streams and that are in the pilot set; and S510 includes: determining, by the terminal device, the M pilots in the pilot set according to the first indication information.

In one embodiment, the receiving, by the terminal device, first indication information sent by the network device includes: receiving, by the terminal device, the first indication information that is sent by the network device by using radio resource control RRC signaling or downlink control information DCI.

In one embodiment, S510 may be implemented in a grant free (Grant Free) mode. In one embodiment, the terminal device may select the M pilots from the pilot set for transmission of the N data streams, the terminal device sends the M pilots to the network device, and the network device obtains the M pilots through blind detection. The network device may determine, by using check information or the like, that the M pilots belong to the pilots sent by the terminal device.

S520. The terminal device communicates the N data streams to the network device by using the M pilots.

In one embodiment, the first indication information is further used to indicate correspondences between the N data streams and the M pilots; and S520 includes: determining, by the terminal device, in the M pilots based on the correspondences, a pilot corresponding to each of the N data streams; and communicating, by the terminal device, each of the N data streams by using the pilot corresponding to each of the N data streams.

In one embodiment, the correspondences between the N data streams and the M pilots may be indicated by the network device to the terminal device by using the first indication information, or may be pre-agreed on in a protocol. This is not limited in this embodiment of this application.

In one embodiment, S520 includes: receiving, by the terminal device, the M pilots sent by the network device; performing, by the terminal device, downlink channel estimation based on the M pilots; and then receiving, by the terminal device, N downlink data streams based on a downlink channel estimation result.

In one embodiment, S520 further includes: sending, by the terminal device, the N uplink data streams and the M pilots to the network device; performing, by the network device uplink channel estimation based on the M pilots; and then receiving, by the network device, the N uplink data streams based on an uplink channel estimation result.

Therefore, according to the communications method provided in this embodiment of this application, the terminal device may determine the M pilots for transmitting the N data streams, where a quantity of the pilots is greater than a quantity of the data streams. Pilot aggregation is implemented by using the plurality of pilots, to improve accuracy of channel estimation, measurement, tracking, and the like. In addition, further, the terminal device may determine a quantity of used pilots based on the channel quality or the priority of the terminal device. A higher priority indicates more aggregated pilots, or poorer channel quality indicates more aggregated pilots. In this way, different quantities of pilots may be selected for different cases, thereby improving pilot transmission flexibility.

With reference to FIG. 1 to FIG. 12, the foregoing describes in detail the communications method according to the embodiments of this application. With reference to FIG. 13 to FIG. 20, the following describes in detail communications apparatuses according to embodiments of this application.

Figure 13:
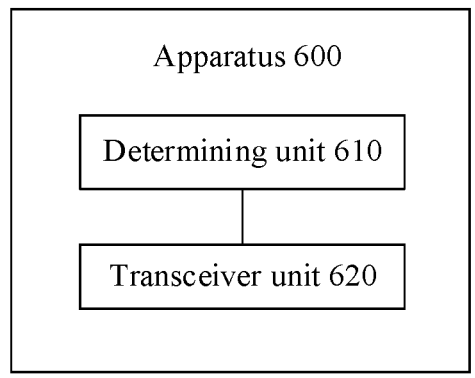
FIG. 13 is a schematic diagram of a communications apparatus according to an embodiment of this application.

FIG. 13 shows a communications apparatus 600 according to an embodiment of this application. The apparatus 600 includes:
- a determining unit 610, configured to determine a target pilot in a pilot set, where the pilot set includes at least a first pilot and a second pilot, and a time-frequency resource occupied by the first pilot partially overlaps a time-frequency resource occupied by the second pilot; and
- a transceiver unit 620, configured to send first indication information to a terminal device, where the first indication information is used to indicate the target pilot in the pilot set.

The transceiver unit 620 is further configured to communicate with the terminal device based on the target pilot.

In one embodiment, a density of the time-frequency resource occupied by the first pilot is different from a density of the time-frequency resource occupied by the second pilot.

In one embodiment, the time-frequency resource occupied by the first pilot is a union set of the time-frequency resource occupied by the second pilot and a time-frequency resource occupied by a third pilot in the pilot set.

In one embodiment, a part of a pilot sequence corresponding to the first pilot is the same as at least a part of a pilot sequence corresponding to the second pilot.

In one embodiment, the transceiver unit is configured to send the first indication information to the terminal device by using RRC signaling or DCI.

It should be understood that, the apparatus 600 herein is presented in a form of functional units. The term "unit" herein may be an application-specific integrated circuit (ASIC), an electronic circuit, a processor (for example, a shared processor, a special purpose processor, or a group processor) configured to execute one or more software or firmware programs, a memory, a merge logic circuit, and/or another suitable component that supports the described function. In an example, a person skilled in the art may understand that, the apparatus 600 may be the network device in the embodiment of the foregoing method 200, and the apparatus 600 may be configured to perform procedures and/or steps or operations in the embodiment of the foregoing method 200 that correspond to the network device. To avoid repetition, details are not described herein again.

Figure 14:
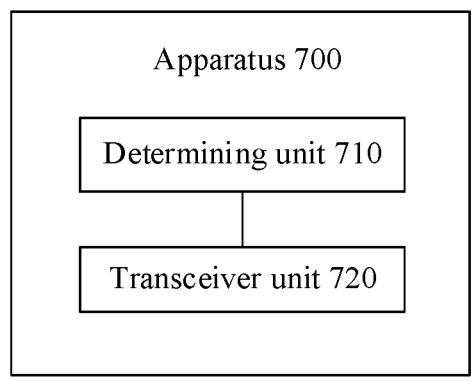
FIG. 14 is a schematic diagram of another communications apparatus according to an embodiment of this application.

FIG. 14 shows a communications apparatus 700 according to an embodiment of this application. The apparatus 700 includes:
- a determining unit 710, configured to determine a target pilot in a pilot set, where the pilot set includes at least a first pilot and a second pilot, and a time-frequency resource occupied by the first pilot partially overlaps a time-frequency resource occupied by the second pilot; and
- a transceiver unit 720, configured to communicate with a network device based on the target pilot.

In one embodiment, a density of the time-frequency resource occupied by the first pilot is different from a density of the time-frequency resource occupied by the second pilot.

In one embodiment, the time-frequency resource occupied by the first pilot is a union set of the time-frequency resource occupied by the second pilot and a time-frequency resource occupied by a third pilot in the pilot set.

In one embodiment, a part of a pilot sequence corresponding to the first pilot is the same as at least a part of a pilot sequence corresponding to the second pilot.

In one embodiment, the transceiver unit 720 is further configured to receive first indication information sent by the network device, where the first indication information is used to indicate the target pilot in the pilot set; and the determining unit 710 is configured to determine the target pilot in the pilot set according to the first indication information.

In one embodiment, the transceiver unit 720 is configured to receive the first indication information that is sent by the network device by using RRC signaling or DCI.

It should be understood that, the apparatus 700 herein is presented in a form of functional units. The term "unit" herein may be an application-specific integrated circuit (ASIC), an electronic circuit, a processor (for example, a shared processor, a special purpose processor, or a group processor) configured to execute one or more software or firmware programs, a memory, a merge logic circuit, and/or another suitable component that supports the described function. In an example, a person skilled in the art may understand that, the apparatus 700 may be the terminal device in the embodiment of the foregoing method 300, and the apparatus 700 may be configured to perform procedures and/or steps or operations in the embodiment of the foregoing method 300 that correspond to the terminal device. To avoid repetition, details are not described herein again.

Figure 15:
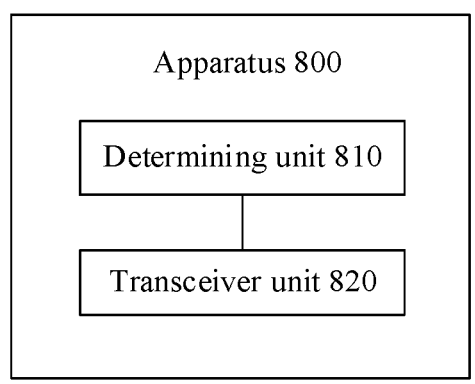
FIG. 15 is a schematic diagram of still another communications apparatus according to an embodiment of this application.

FIG. 15 shows a communications apparatus 800 according to an embodiment of this application. The apparatus 800 includes:
- a determining unit 810, configured to determine, in a pilot set, M pilots that are used to transmit N data streams, where M and N are positive integers, and M is greater than N; and
- a transceiver unit 820, configured to send first indication information to a terminal device, where the first indication information is used to indicate the M pilots in the pilot set.

The transceiver unit 820 is further configured to communicate the N data streams to the terminal device based on the M pilots.

In one embodiment, the first indication information is further used to indicate correspondences between the N data streams and the M pilots.

In one embodiment, the transceiver unit is configured to send the first indication information to the terminal device by using radio resource control RRC signaling or downlink control information DCI.

It should be understood that, the apparatus 800 herein is presented in a form of functional units. The term "unit" herein may be an application-specific integrated circuit (ASIC), an electronic circuit, a processor (for example, a shared processor, a special purpose processor, or a group processor) configured to execute one or more software or firmware programs, a memory, a merge logic circuit, and/or another suitable component that supports the described function. In an example, a person skilled in the art may understand that, the apparatus 800 may be the network device in the embodiment of the foregoing method 400, and the apparatus 800 may be configured to perform procedures and/or steps or operations in the embodiment of the foregoing method 400 that correspond to the network device. To avoid repetition, details are not described herein again.

Figure 16:
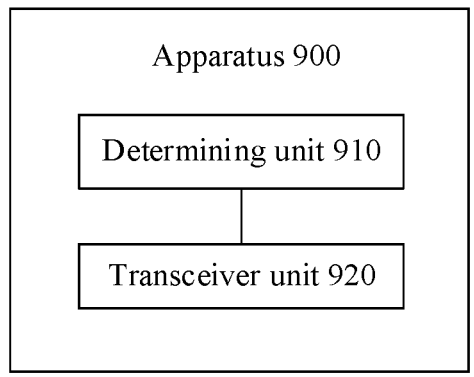
FIG. 16 is a schematic diagram of still another communications apparatus according to an embodiment of this application.

FIG. 16 shows a communications apparatus 900 according to an embodiment of this application. The apparatus 900 includes:

a determining unit 910, configured to determine, in a pilot set, M pilots that are used to transmit N data streams, where M and N are positive integers, and M is greater than N; and a transceiver unit 920, configured to communicate the N data streams to a network device based on the M pilots.

In one embodiment, the transceiver unit 920 is further configured to receive first indication information sent by the network device, where the first indication information is used to indicate the M pilots that are used to transmit the N data streams and that are in the pilot set; and the determining unit 910 is configured to determine the M pilots in the pilot set according to the first indication information.

In one embodiment, the first indication information is further used to indicate correspondences between the N data streams and the M pilots; the determining unit 910 is further configured to determine, in the M pilots based on the correspondences, a pilot corresponding to each of the N data streams; and the transceiver unit 920 is further configured to communicate each of the N data streams by using the pilot corresponding to each of the N data streams.

In one embodiment, the transceiver unit 920 is configured to receive the first indication information that is sent by the network device by using radio resource control RRC signaling or downlink control information DCI.

It should be understood that, the apparatus 900 herein is presented in a form of functional units. The term "unit" herein may be an application-specific integrated circuit (ASIC), an electronic circuit, a processor (for example, a shared processor, a special purpose processor, or a group processor) configured to execute one or more software or firmware programs, a memory, a merge logic circuit, and/or another suitable component that supports the described function. In an example, a person skilled in the art may understand that, the apparatus 900 may be the terminal device in the embodiment of the foregoing method 500, and the apparatus 900 may be configured to perform procedures and/or steps or operations in the embodiment of the foregoing method 500 that correspond to the terminal device. To avoid repetition, details are not described herein again.

Any one of the apparatus 600 to the apparatus 900 completely corresponds to the network device or the terminal device in the method embodiments, and a corresponding unit performs a corresponding step or operation. For example, the transceiver unit performs receiving and sending steps or operations in the method embodiments, and other steps or operations than the receiving and sending steps or operations may be performed by a processing module. For a function of a specific module, refer to a corresponding method embodiment. Details are not described herein again.

The network device and the terminal device in the foregoing solutions have functions of implementing corresponding steps or operations performed by the network device and the terminal device in the foregoing methods. The functions may be implemented by hardware, or may be implemented by hardware executing corresponding software. The hardware or the software includes one or more modules corresponding to the foregoing functions. For example, a sending unit may be replaced with a transmitter, a receiving unit may be replaced with a receiver, and another unit such as the determining unit may be replaced with a processor, to respectively perform a sending operation, a receiving operation, and a related processing operation in the method embodiments.

Figure 17:
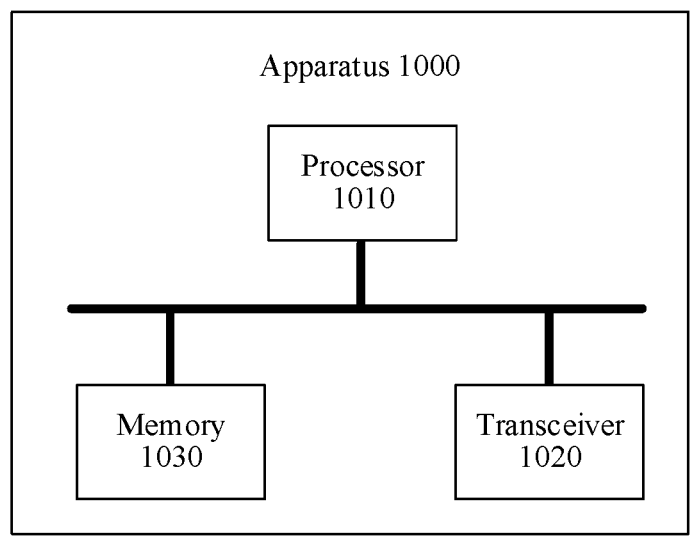
FIG. 17 is a schematic diagram of still another communications apparatus according to an embodiment of this application.

FIG. 17 shows still another communications apparatus 1000 according to an embodiment of this application. The apparatus 1000 includes a processor 1010, a transceiver 1020, and a memory 1030. The processor 1010, the transceiver 1020, and the memory 1030 communicate with each other by using an internal connection path. The memory 1030 is configured to store an instruction. The processor 1010 is configured to execute the instruction stored in the memory 1030, to control the transceiver 1020 to send a signal and/or receive a signal.

The processor 1010 is configured to determine a target pilot in a pilot set, where the pilot set includes at least a first pilot and a second pilot, and a time-frequency resource occupied by the first pilot partially overlaps a time-frequency resource occupied by the second pilot. The transceiver 1020 is configured to send first indication information to a terminal device, where the first indication information is used to indicate the target pilot in the pilot set. The transceiver 1020 is further configured to communicate with the terminal device based on the target pilot.

It should be understood that, the apparatus 1000 may be the network device in the embodiment of the foregoing method 200, and may be configured to perform steps and/or procedures or operations in the embodiment of the foregoing method 200 that correspond to the network device. In one embodiment, the memory 1030 may include a read-only memory and a random access memory, and provide an instruction and data to the processor. A part of the memory may further include a non-volatile random access memory. For example, the memory may further store information about a device type. The processor 1010 may be configured to execute the instruction stored in the memory, and when the processor 1010 executes the instruction stored in the memory, the processor 1010 is configured to perform steps and/or procedures or operations in the embodiment of the foregoing method 200 that correspond to the network device.

Figure 18:
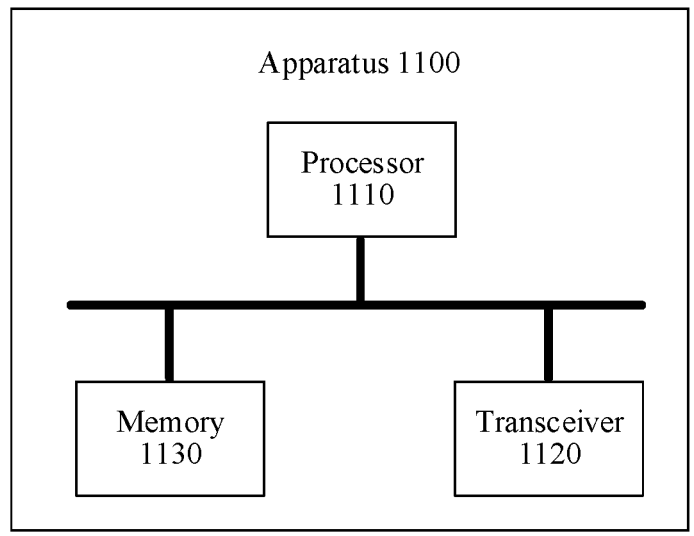
FIG. 18 is a schematic diagram of still another communications apparatus according to an embodiment of this application.

FIG. 18 shows still another communications apparatus 1100 according to an embodiment of this application. The apparatus 1100 includes a processor 1110, a transceiver 1120, and a memory 1130. The processor 1110, the transceiver 1120, and the memory 1130 communicate with each other by using an internal connection path. The memory 1130 is configured to store an instruction. The processor 1110 is configured to execute the instruction stored in the memory 1130, to control the transceiver 1120 to send a signal and/or receive a signal.

The processor 1110 is configured to determine a target pilot in a pilot set, where the pilot set includes at least a first pilot and a second pilot, and a time-frequency resource occupied by the first pilot partially overlaps a time-frequency resource occupied by the second pilot. The transceiver 1120 communicates with a network device based on the target pilot.

It should be understood that, the apparatus 1100 may be the terminal device in the embodiment of the foregoing method 300, and may be configured to perform steps and/or procedures or operations in the embodiment of the foregoing method 300 that correspond to the terminal device. In one embodiment, the memory 1130 may include a read-only memory and a random access memory, and provide an instruction and data to the processor. A part of the memory may further include a non-volatile random access memory. For example, the memory may further store information about a device type. The processor 1110 may be configured to execute the instruction stored in the memory. In addition, when the processor 1110 executes the instruction stored in the memory, the processor 1110 is configured to perform steps and/or procedures or operations in the embodiment of the foregoing method 300 that correspond to the terminal device.

Figure 19:
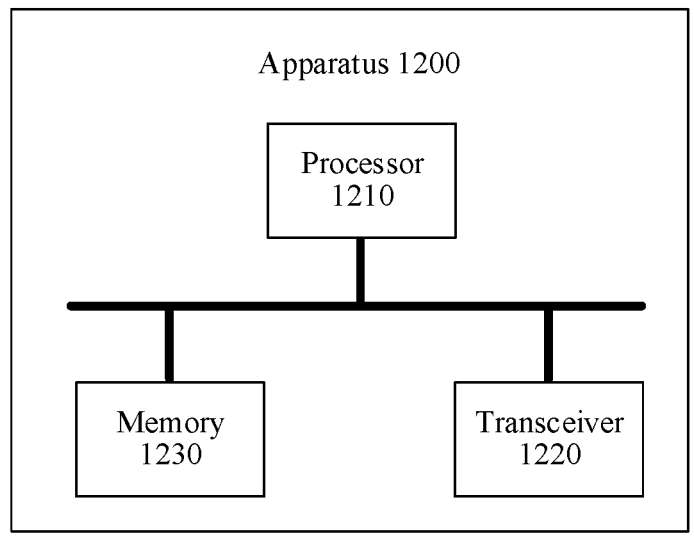
FIG. 19 is a schematic diagram of still another communications apparatus according to an embodiment of this application.

FIG. 19 shows still another communications apparatus 1200 according to an embodiment of this application. The apparatus 1200 includes a processor 1210, a transceiver 1220, and a memory 1230. The processor 1210, the transceiver 1220, and the memory 1230 communicate with each other by using an internal connection path. The memory 1230 is configured to store an instruction. The processor 1210 is configured to execute the instruction stored in the memory 1230, to control the transceiver 1220 to send a signal and/or receive a signal.

The processor 1210 is configured to determine, in a pilot set, M pilots that are used to transmit N data streams, where M and N are positive integers, and M is greater than N. The transceiver 1220 is configured to send first indication information to the terminal device, where the first indication information is used to indicate the M pilots in the pilot set. The transceiver 1220 is further configured to communicate the N data streams to the terminal device based on the M pilots.

It should be understood that, the apparatus 1200 may be the network device in the embodiment of the foregoing method 400, and may be configured to perform steps and/or procedures or operations in the embodiment of the foregoing method 400 that correspond to the network device. In one embodiment, the memory 1230 may include a read-only memory and a random access memory, and provide an instruction and data to the processor. A part of the memory may further include a non-volatile random access memory. For example, the memory may further store information about a device type. The processor 1210 may be configured to execute the instruction stored in the memory. In addition, when the processor 1210 executes the instruction stored in the memory, the processor 1210 is configured to perform steps and/or procedures or operations in the embodiment of the foregoing method 400 that correspond to the network device.

Figure 20:
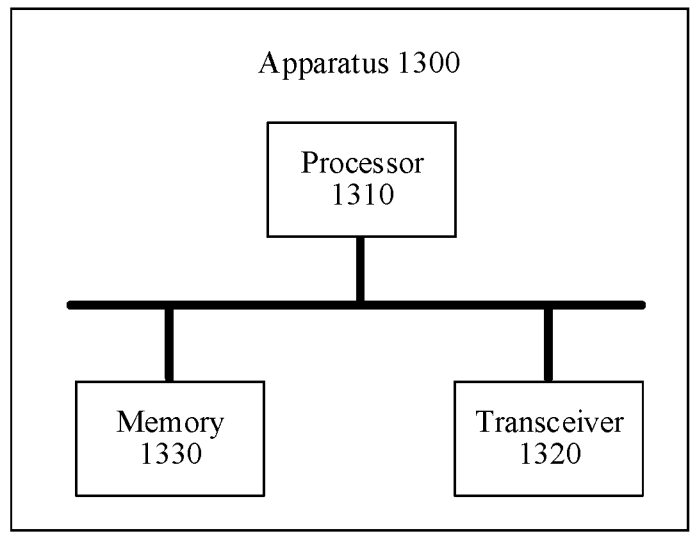
FIG. 20 is a schematic diagram of still another communications apparatus according to an embodiment of this application.

FIG. 20 shows still another communications apparatus 1300 according to an embodiment of this application. The apparatus 1300 includes a processor 1310, a transceiver 1320, and a memory 1330. The processor 1310, the transceiver 1320, and the memory 1330 communicate with each other by using an internal connection path. The memory 1330 is configured to store an instruction. The processor 1310 is configured to execute the instruction stored in the memory 1330, to control the transceiver 1320 to send a signal and/or receive a signal.

The processor 1310 is configured to determine, in a pilot set, M pilots that are used to transmit N data streams, where M and N are positive integers, and M is greater than N. The transceiver 1320 is configured to communicate the N data streams to a network device based on the M pilots.

It should be understood that, the apparatus 1300 may be the terminal device in the embodiment of the foregoing method 500, and may be configured to perform steps and/or procedures or operations in the embodiment of the foregoing method 500 that correspond to the terminal device. In one embodiment, the memory 1330 may include a read-only memory and a random access memory, and provide an instruction and data to the processor. A part of the memory may further include a non-volatile random access memory. For example, the memory may further store information about a device type. The processor 1310 may be configured to execute the instruction stored in the memory. In addition, when the processor 1310 executes the instruction stored in the memory, the processor 1310 is configured to perform steps and/or procedures or procedures in the embodiment of the foregoing method 500 that correspond to the terminal device.

It should be noted that "determining a target pilot in a pilot set" mentioned in the foregoing embodiment may also be understood as determining a target pilot port in a pilot port set. Correspondingly, "indicating a target pilot in a pilot set" may also be understood as indicating a target pilot port in a pilot port set.

Figure 23:
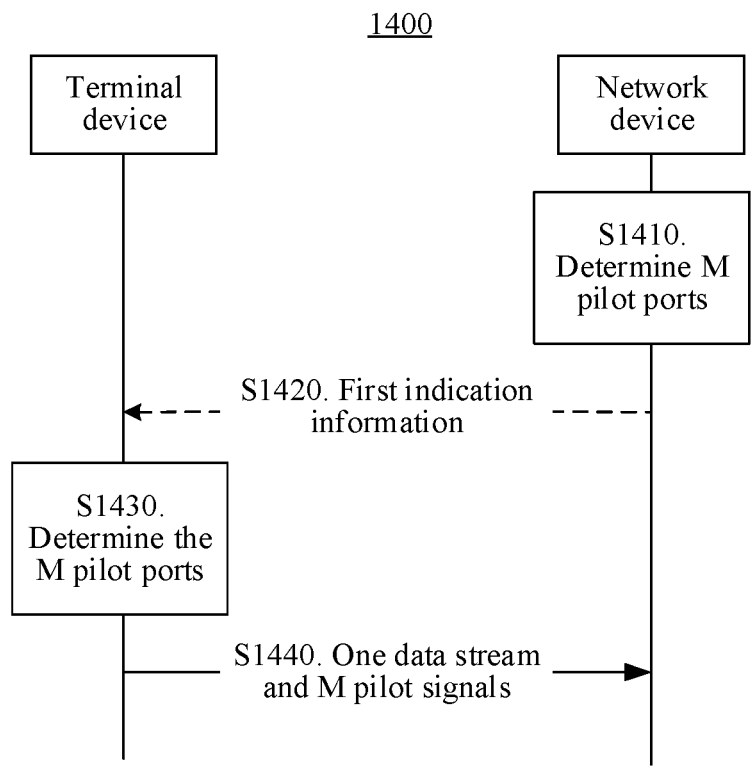
FIG. 23 is a schematic diagram of a communications method according to an embodiment of this application.

FIG. 23 shows a communications method 1400 according to an embodiment of this application. The method 1400 includes the following steps or operations.

S1410. A network device determines M pilot ports that are used by a terminal device to transmit one data stream, where M is a positive integer greater than or equal to 2.

In one embodiment, user detection and/or channel estimation may be independently performed by using a pilot signal corresponding to each of the M pilot ports. User detection means that the network device obtains, by detecting a pilot signal, an identifier of the terminal device that sends the pilot signal or a physical layer transmission parameter corresponding to a data signal corresponding to the pilot signal. The data signal corresponding to the pilot signal and the pilot signal are sent by a same terminal device.

S1420. The network device sends first indication information to the terminal device, and the terminal device receives the first indication information sent by the network device, where the first indication information is used to indicate the M pilot ports.

In one embodiment, the sending, by the network device, first indication information to the terminal device includes: sending, by the network device, the first indication information by using downlink control information or radio resource control signaling. The terminal device receives the first indication information that is sent by the network device by using the downlink control information or the radio resource control signaling.

For example, different values of a specific indication field in the downlink control information DCI are used to indicate different pilot ports. As shown in Table 1, the first column indicates a value of the specific indication field in the DCI, the second column indicates a number of a pilot port, and different values of the indication field correspond to different numbers of pilot ports. For example, assuming that the value of the specific indication field is 2, pilot ports that are used to transmit the data stream are two pilot ports numbered 6 and 7. In this application, the specific indication field is a field that may be used to indicate a pilot port and that is in the DCI, and may be a newly added field in DCI in the prior art, or may reuse an existing field in DCI in an existing technology. How to implement the specific indication field is not limited in the present application.

TABLE 1

| Value of an indication field | Number of a pilot port |
|---|---|
| 0 | 0, 1 |
| 1 | 1, 6 |
| 2 | 6, 7 |
| 3 | 0, 6 |
| 4 | 1, 7 |
| 5 | 0, 7 |
| 6 | 2, 3 |
| 7 | 3, 8 |
| 8 | 8, 9 |

TABLE 1-continued

| Value of an indication field | Number of a pilot port |
|---|---|
| 9 | 2, 8 |
| 10 | 3, 9 |
| 11 | 2, 9 |
| 12 | 4, 5 |
| 13 | 5, 10 |
| 14 | 10, 11 |
| 15 | 4, 10 |
| 16 | 5, 11 |
| 17 | 4, 11 |

In one embodiment, the first indication information is used to indicate an identifier of each of the M pilot ports. For example, the identifier of each pilot port may be a number of the pilot port.

In one embodiment, the first indication information is used to indicate an identifier of a new pilot port formed by the M pilot ports, and the M pilot ports may be referred to as old pilot ports. For example, the identifier of the new pilot port may be a number of the new pilot port. Both the terminal device and the network device store a new pilot port set. The new pilot port set includes a plurality of new pilot ports, and each new pilot port is defined as aggregation of a plurality of pilot ports. After receiving the first indication information sent by the network device, the terminal device determines a new pilot port in the new pilot port set according to the first indication information, and determines the M pilot ports based on the new pilot port. In this way, a terminal may send M pilot signals corresponding to the M pilot ports and the data stream.

In an embodiment, both the terminal device and the network device may store one pilot port set. After determining the M pilot ports, the network device may send the first indication information to the terminal device to indicate the M pilot ports, and the terminal device determines the M pilot ports in the pilot port set according to the first indication information, to transmit the data stream.

In another embodiment, the terminal device and the network device may not store a pilot port set. The terminal device may determine the M pilot ports based on a preset correspondence between a value of the specific indication field representing the first indication information and a pilot port. For example, the preset relationship may be specified in a standard or a protocol.

S1430. The terminal device determines the M pilot ports that are used to transmit the data stream, where M is a positive integer greater than or equal to 2.

The terminal device may determine, according to the first indication information in S1420, the M pilot ports for transmitting the data stream, or the terminal device determines the M pilot ports, for example, selects M pilot ports from a pilot port set.

In this embodiment of this application, the M pilot ports determined by the terminal device or the network device may be from the following two different sources:

1. In one embodiment, a first pilot port in the M pilot ports belongs to a first pilot port set; a second pilot port in the M pilot ports belongs to a second pilot port set; pilot signals corresponding to any two pilot ports in the first pilot port set occupy a same time-frequency resource; any two pilot ports in the second pilot port set correspond to a same time-frequency resource; and a time-frequency resource corresponding to any pilot port in the first pilot port set is orthogonal to a time-frequency resource corresponding to any pilot port in the second pilot port set.

In one embodiment, pilot ports in each pilot port set are all numbered. For example, numbers of pilot ports in a pilot port set may be sorted in ascending order or descending order.

Figure 24:
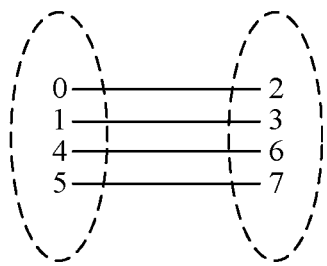
FIG. 24 is a schematic diagram of a pilot port set according to an embodiment of this application.
Figure 25:
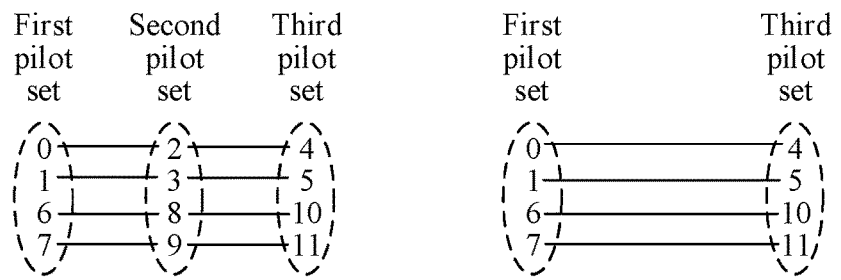
FIG. 25 is a schematic diagram of another pilot port set according to an embodiment of this application.

In one embodiment, a ranking corresponding to a number of the first pilot port in the first pilot set may be the same as a ranking corresponding to a number of the second pilot port in the second pilot set. It is assumed that M is equal to 2. In a dual-symbol configuration in a configuration 1, as shown in FIG. 24, the first pilot port set includes pilot ports numbered 0, 1, 4, and 5, and the second pilot port set includes pilot ports numbered 2, 3, 6, and 7. The pilot port 0 in the first pilot port set and the pilot port 2 in the second pilot port set are used to transmit the data stream. Alternatively, the pilot port 1 in the first pilot port set and the pilot port 3 in the second pilot port set are used to transmit the data stream. Alternatively, the pilot port 4 in the first pilot port set and the pilot port 6 in the second pilot port set are used to transmit the data stream. Alternatively, the pilot port 5 in the first pilot port set and the pilot port 7 in the second pilot port set are used to transmit the data stream. As shown in FIG. 25, in a dual-symbol configuration in a configuration 2, the first pilot port set includes pilot ports numbered 0, 1, 6, and 7, the second pilot port set includes pilot ports numbered 2, 3, 8, and 9, and a third pilot port set includes pilot ports numbered 4, 5, 10, and 11. The pilot port 0 in the first pilot port set and the pilot port 2 in the second pilot port set are used to transmit the data stream. Alternatively, the pilot port 1 in the first pilot port set and the pilot port 3 in the second pilot port set are used to transmit the data stream. Alternatively, the pilot port 6 in the first pilot port set and the pilot port 8 in the second pilot port set are used to transmit the data stream. Alternatively, the pilot port 7 in the first pilot port set and the pilot port 9 in the second pilot port set are used to transmit the data stream. Alternatively, the pilot port 2 in the second pilot port set and the pilot port 4 in the third pilot port set are used to transmit the data stream. Alternatively, the pilot port 3 in the second pilot port set and the pilot port 5 in the third pilot port set are used to transmit the data stream. Alternatively, the pilot port 8 in the second pilot port set and the pilot port 10 in the third pilot port set are used to transmit the data stream. Alternatively, the pilot port 9 in the second pilot port set and the pilot port 11 in the third pilot port set are used to transmit the data stream. Alternatively, the pilot port 0 in the first pilot port set and the pilot port 4 in the third pilot port set are used to transmit the data stream. Alternatively, the pilot port 1 in the first pilot port set and the pilot port 5 in the third pilot port set are used to transmit the data stream. Alternatively, the pilot port 6 in the first pilot port set and the pilot port 10 in the third pilot port set are used to transmit the data stream. Alternatively, the pilot port 7 in the first pilot port set and the pilot port 11 in the third pilot port set are used to transmit the data stream.

Figure 26:
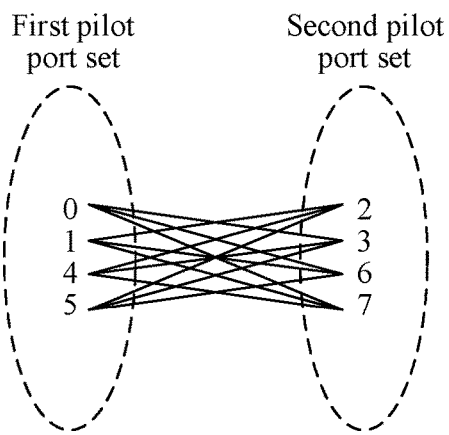
FIG. 26 is a schematic diagram of still another pilot port set according to an embodiment of this application.
Figure 27:
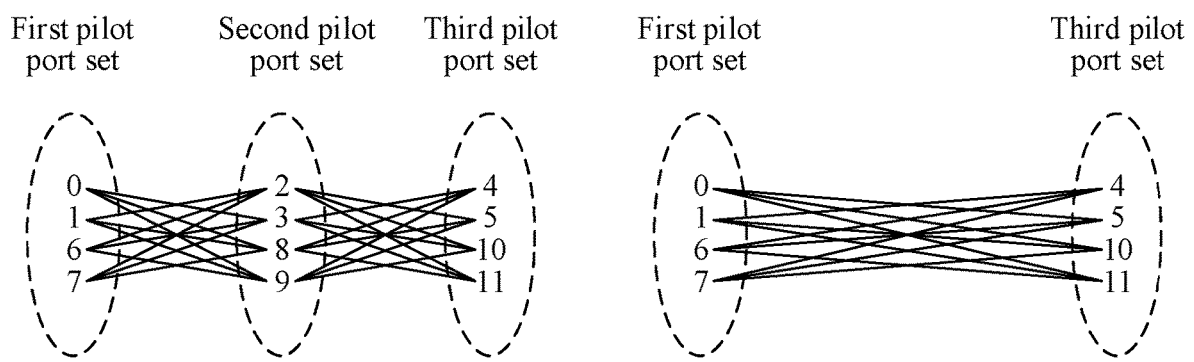
FIG. 27 is a schematic diagram of still another pilot port set according to an embodiment of this application.

In one embodiment, a ranking corresponding to a number of the first pilot port in the first pilot set may be different from a ranking corresponding to a number of the second pilot port in the second pilot set. It is assumed that M is equal to 2. In a dual-symbol configuration in a configuration 1, as shown in FIG. 26, the first pilot port set includes pilot ports numbered 0, 1, 4, and 5, and the second pilot port set includes pilot ports numbered 2, 3, 6, and 7. In this case, the pilot port 0 in the first pilot port set and the pilot port 3, the pilot port 6, or the pilot port 7 in the second pilot port set are used to transmit the data stream. Alternatively, the pilot port 1 in the first pilot port set and the pilot port 2, the pilot port 6, or the pilot port 7 in the second pilot port set are used to transmit the data stream. Alternatively, the pilot port 4 in the first pilot port set and the pilot port 2, the pilot port 3, or the pilot port 7 in the second pilot port set are used to transmit the data stream. Alternatively, the pilot port 5 in the first pilot port set and the pilot port 2, the pilot port 3, or the pilot port 6 in the second pilot port set are used to transmit the data stream. It is assumed that M is equal to 2. In a dual-symbol configuration in a configuration 2, as shown in FIG. 27, to avoid repetition, that the M pilot ports are which pilot ports in the three pilot port sets is not described by using an example in detail herein.

In one embodiment, the first pilot port set, the second pilot port set, and the third pilot port set may be the foregoing code division multiplexing groups. In one embodiment, in this embodiment of this application, the M pilot ports that are used to transmit the data stream may be from different pilot port sets, and pilot ports in each pilot port set correspond to a same time-frequency resource. Time-frequency resources corresponding to pilot ports in the pilot port sets are orthogonal. The terminal device sends pilot signals corresponding to the M pilot ports from different pilot port sets and the data stream, and a quantity of time-frequency resources corresponding to the M pilot ports is greater than a quantity of time-frequency resources corresponding to one pilot port. When jointly performing channel estimation based on the pilot signals corresponding to the M pilot ports, the network device can obtain a relatively accurate channel estimation result, thereby improving accuracy of performing data demodulation based on the channel estimation result. Further, when pilot signals corresponding to some of the M pilot ports collide with a pilot signal corresponding to a pilot port of another user, the network device may perform channel estimation and/or user detection by using pilot signals corresponding to remaining pilot ports in the M pilot ports. In this way, the user detection and/or the channel estimation can still be performed, thereby improving data transmission reliability.

2. In one embodiment, any two of the M pilot ports belong to a same pilot port set; any two pilot ports in the same pilot port set correspond to a same time-frequency resource; and pilot sequences corresponding to any two different pilot ports are orthogonal.

Figure 28:
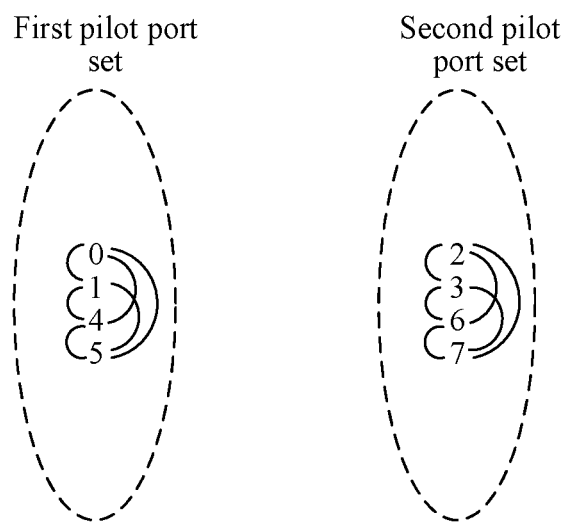
FIG. 28 is a schematic diagram of still another pilot port set according to an embodiment of this application.
Figure 29:
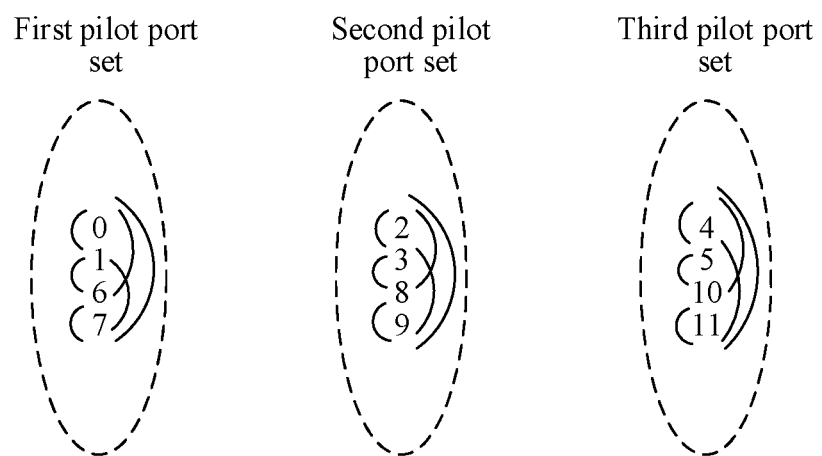
FIG. 29 is a schematic diagram of still another pilot port set according to an embodiment of this application.

It is assumed that M is equal to 2. As shown in FIG. 28, in a dual-symbol configuration in a configuration 1, the first pilot port set includes pilot ports numbered 0, 1, 4, and 5, and the second pilot port set includes pilot ports numbered 2, 3, 6, and 7. The pilot ports 0 and 1 in the first pilot port set are used to transmit the data stream. Alternatively, the pilot ports 1 and 4 in the first pilot port set are used to transmit the data stream. Alternatively, the pilot ports 4 and 5 in the first pilot port set are used to transmit the data stream. Alternatively, the pilot ports 0 and 4 in the first pilot port set are used to transmit the data stream. Alternatively, the pilot ports 1 and 5 in the first pilot port set are used to transmit the data stream. Alternatively, the pilot ports 0 and 5 in the first pilot port set are used to transmit the data stream. The pilot ports 2 and 3 in the second pilot port set are used to transmit the data stream. Alternatively, the pilot ports 3 and 6 in the second pilot port set are used to transmit the data stream. Alternatively, the pilot ports 6 and 7 in the second pilot port set are used to transmit the data stream. Alternatively, the pilot ports 2 and 6 in the second pilot port set are used to transmit the data stream. Alternatively, the pilot ports 3 and 7 in the second pilot port set are used to transmit the data stream. Alternatively, the pilot ports 2 and 7 in the second pilot port set are used to transmit the data stream. It is assumed that M is equal to 2. In a dual-symbol configuration in a configuration 2, as shown in FIG. 29, to avoid repetition, that the M pilot ports are which pilot ports in the three pilot port sets is not described by using an example in detail herein.

In one embodiment, the same pilot port set may be the foregoing code division multiplexing group. In one embodiment, in this embodiment of this application, the M pilot ports that are used to transmit the data stream may be from a same pilot port set, and pilot ports in the same pilot port set correspond to a same time-frequency resource. The terminal device sends pilot signals corresponding to the M pilot ports from a same pilot port set and the data stream, and time-frequency resources for the M pilot ports are the same. In this way, when pilot signals corresponding to some of the M pilot ports collide with a pilot signal corresponding to a pilot port of another user, the network device may perform user detection and/or channel estimation by using pilot signals corresponding to remaining pilot ports in the M pilot ports. In this way, the user detection and/or the channel estimation can still be performed, thereby improving data transmission reliability.

S1440. The terminal device sends, to the network device, the M pilot signals and the data stream that have been subject to same precoding processing, and the network device receives the M pilot signals and the data stream that have been subject to the same precoding processing and that are sent by the terminal device, where the M pilot signals are respectively generated based on the M pilot ports.

In this application, that a pilot signal is generated based on a pilot port means that a pilot sequence is generated by using a preset sequence generation formula based on a parameter that is used to generate a sequence and that corresponds to the pilot port, and then the generated pilot sequence is mapped to a time-frequency resource determined based on a parameter that is used to determine a time-frequency resource and that corresponds to the pilot port, to form the pilot signal. Further, precoding processing may be performed on the pilot signal, to obtain a pilot signal after the precoding processing.

In another embodiment, a pilot signal after precoding processing may alternatively be obtained in the following manner: Precoding processing is first performed on a pilot sequence, and then the pilot sequence after the precoding processing is mapped to a time-frequency resource determined based on a parameter that is used to determine a time-frequency resource and that corresponds to the pilot port, to obtain a pilot signal after the precoding processing.

For a data stream $x(i)$, where i is a sequence number of data in the data stream, a precoding processing process may be expressed as follows:

$$\begin{pmatrix} y_0(i) \\ \dots \\ y_{P-1}(i) \end{pmatrix} = \begin{pmatrix} w_0 \\ \dots \\ w_{P-1} \end{pmatrix} x(i)$$

where $$\begin{pmatrix} y_0(i) \\ \dots \\ y_{P-1}(i) \end{pmatrix}$$

is precoded data, P is a quantity of precoded data streams (or a quantity of antenna ports), and $$\begin{pmatrix} w_0 \\ \ldots \\ w_{P-1} \end{pmatrix}$$

is a precoding vector corresponding to the data streams.

A precoding processing process of a pilot signal is similar to a precoding processing process of a data stream. In this application, that the pilot signal and the data stream have been subject to the same precoding processing means that a precoding vector used when the precoding processing is performed on the pilot signal is the same as a precoding vector used when the precoding processing is performed on the data stream.

Particularly, when the precoding vector is 1, precoded data is the same as data before precoding, or it may be considered that data before precoding is not precoded. In this application, this case is also considered as precoding processing, but a precoding matrix is 1.

In one embodiment, in a process of processing a data stream, precoding processing is first performed on the data stream, and then resource mapping is performed on the data stream after the precoding processing. In a process of processing a pilot signal corresponding to the data stream, resource mapping is first performed on a pilot sequence, and then precoding processing is performed on the pilot sequence after the resource mapping. A case in which a precoding vector used for the precoding processing on the data stream is the same as a precoding vector used for the precoding processing on the pilot signal corresponding to the data stream is considered as that the data stream and the pilot signal have been subject to same precoding processing in this application. Similarly, in another implementation, resource mapping is first performed on the data stream, and then precoding processing is performed on the data stream; and precoding processing is performed on the pilot sequence corresponding to the data stream, and then resource mapping is performed on the pilot sequence. A case in which precoding vectors used for the precoding processing are the same is also considered as that the data stream and the pilot signal have been subject to the same precoding processing.

It should be understood that, in this embodiment of this application, for a data stream, a pilot signal corresponding to an aggregated pilot port and the data stream have been subject to same precoding processing. For example, the pilot sequence corresponding to the pilot port and the data stream may be mapped to one antenna port, or the pilot sequence corresponding to the pilot port and the data stream may be mapped to a plurality of antenna ports after precoding processing. The terminal device may further perform a precoding operation on signals on a plurality of antenna ports, and map the signals to a plurality of antennas for sending.

In this embodiment of this application, after the M pilot signals and the data stream have been subject to the same precoding processing, after receiving the M pilot signals and the data stream, the network device may perform same processing on the M pilot signals and the data stream. In this way, processing performed by the network device in a receiving process can be simplified.

It should be noted that this embodiment of this application may be used for uplink data transmission or downlink data transmission. In an uplink data transmission process, the network device may determine the M pilot ports that are used by the terminal device to transmit the data stream, and indicate the M pilot ports to the terminal by using the first indication information. The terminal may determine the M pilot ports according to the first indication information, or the terminal device may select the M pilot ports without an indication of the network device. For example, when the terminal device is of a URLLC type, the network device may indicate the M pilot ports to the terminal device by using the first indication information. When the terminal device is of an mMTC type, the terminal device may select the M pilot ports without an indication of the network device. The terminal device may send the pilot signals corresponding to the M pilot ports and the data stream to the network device. The network device may perform channel estimation or user detection by using the M pilot signals. In this way, channel estimation performance or user detection performance can be improved. In addition, when pilot signals corresponding to some of the M pilot ports collide with a pilot signal corresponding to a pilot port of another user, the network device may perform user detection by using pilot signals corresponding to remaining pilot ports in the M pilot ports. In this way, a prior-art problem that channel estimation and/or user detection cannot be performed when a pilot signal corresponding to a pilot port collides with a pilot signal corresponding to a pilot port of another user, leading to a failure of current uplink transmission of the terminal device can be resolved. In a downlink data transmission process, the network device may determine the M pilot ports, and send the M pilot signals corresponding to the M pilot ports and the data stream to the terminal device, and the M pilot signals and the data stream haven been subject to the same precoding processing. The terminal device receives the M pilot signals and the data stream that are sent by the network device, and performs channel estimation based on the M pilot signals. In this way, channel estimation performance can be improved.

Figure 30:
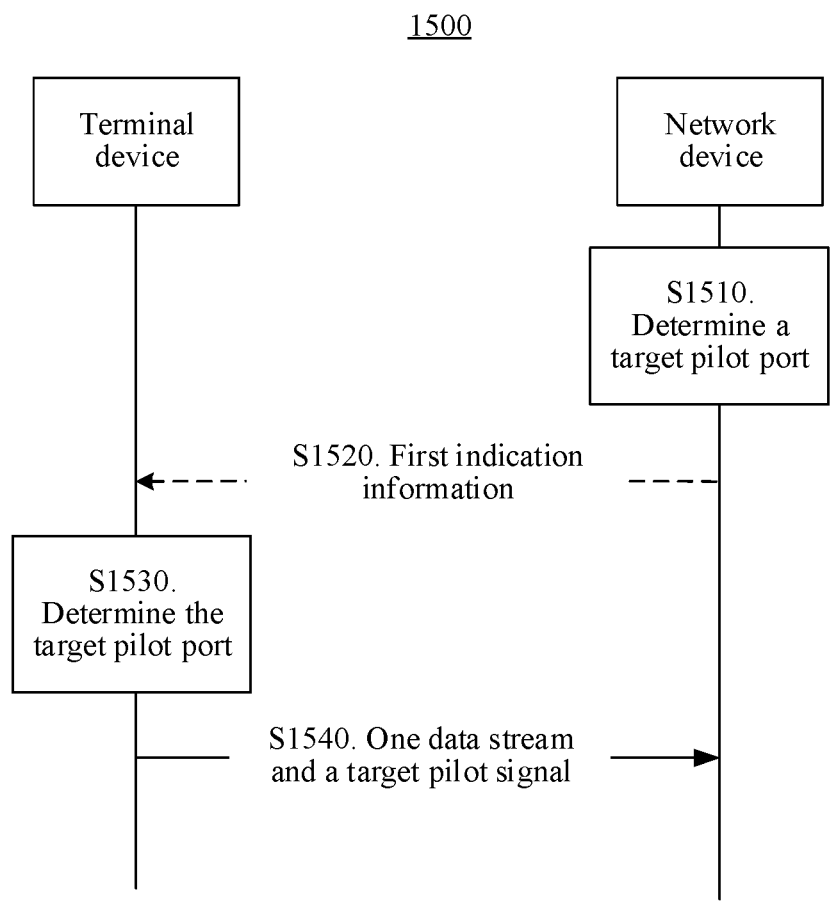
FIG. 30 is a schematic diagram of another communications method according to an embodiment of this application.

FIG. 30 shows a communications method according to an embodiment of this application. The method includes the following steps or operations.

S1510. A network device determines a target pilot port that is used by a terminal device to transmit one data stream, where time-frequency resources corresponding to the target pilot port include a time-frequency resource corresponding to a first pilot port and a time-frequency resource corresponding to a second pilot port, and the time-frequency resource corresponding to the first pilot port is different from the time-frequency resource corresponding to the second pilot port; or a time-frequency resource corresponding to the target pilot port is the same as a time-frequency resource corresponding to the first pilot port, and a pilot sequence corresponding to the target pilot port is superposition of a pilot sequence corresponding to the first pilot port and a pilot sequence corresponding to a second pilot port.

In one embodiment, the time-frequency resource corresponding to the target pilot port is a union set of the time-frequency resource corresponding to the first pilot port and the time-frequency resource corresponding to the second pilot port. The first pilot port may be a pilot port in the first pilot set, and the second pilot port may be a pilot port in the second pilot set. In this way, the target pilot port may be a union set of time-frequency resources corresponding to pilot ports in two different pilot sets. In one embodiment, a time-frequency resource corresponding to any pilot port in the first pilot port set is orthogonal to a time-frequency resource corresponding to any pilot port in the second pilot port set. The target pilot port in this manner may be referred to as an inter-group aggregated pilot port. In one embodiment, the first pilot port and the second pilot port belong to different pilot port sets.

In one embodiment, the time-frequency resource corresponding to the target pilot port may be the same as the time-frequency resource corresponding to the first pilot port. For example, the pilot sequence corresponding to the target pilot port is superposition of values of the pilot sequence corresponding to the first pilot port and the pilot sequence corresponding to the second pilot port. If the time-frequency resource corresponding to the first pilot port overlaps or partially overlaps the time-frequency resource corresponding to the second pilot port, a sequence on the overlapping part of the time-frequency resources is a sum of a sequence of the overlapping part of the time-frequency resource corresponding to the first pilot port and a sequence of the overlapping part of the time-frequency resource corresponding to the second pilot port. The target pilot port in this manner may be referred to as an inter-group aggregated pilot port. In one embodiment, the first pilot port and the second pilot port belong to a same pilot port set, and pilot ports in the pilot port set correspond to a same pilot resource.

S1520. The network device sends first indication information to the terminal device, where the first indication information is used to indicate the target pilot port.

S1530. The terminal device determines the target pilot port used to transmit the data stream.

In one embodiment, the terminal device may determine the target pilot port according to the first indication information in S1520. In one embodiment, the terminal device may determine the target pilot port in a pilot port set stored by the terminal device. This is not limited in this embodiment of this application.

S1540. The terminal device sends, to the network device, a target pilot signal and the data stream that have been subject to same precoding processing, and the network device receives the target pilot signal and the data stream that have been subject to same precoding processing and that are sent by the terminal device, where the target pilot signal is generated based on the target pilot port.

In this embodiment of this application, after the target pilot signal and the data stream have been subject to the same precoding processing, after receiving the target pilot signal and the data stream, the network device may perform same processing on the target pilot signal and the data stream. In this way, processing performed by the network device in a receiving process can be simplified.

In this embodiment of this application, in an uplink data transmission process, the network device may determine the target pilot port that is used by the terminal device to transmit the data stream, and indicate the target pilot port to the terminal device by using the first indication information. The terminal may determine the target pilot port according to the first indication information, or the terminal device may select the target pilot port without an indication of the network device. For example, when the terminal device is of a URLLC type, the network device may indicate the target pilot port to the terminal device by using the first indication information. When the terminal device is of an mMTC type, the terminal device may select the target pilot port without an indication of the network device. The terminal device may send the target pilot signal corresponding to the target pilot port and the data stream to the network device, and the network device may perform channel estimation or user detection by using the target pilot signal. In this way, channel estimation performance can be improved, or user detection performance can be improved. In a downlink data transmission process, the network device may determine the target pilot port, and send the target pilot signal corresponding to the target pilot port and the data stream to the terminal device, and the target pilot signal and the data stream haven been subject to the same precoding processing. The terminal device receives the target pilot signal and the data stream that are sent by the network device, and performs channel estimation based on the target pilot signal. In this way, channel estimation performance can be improved.

It should be understood that, in the embodiments of this application, the method 1400 and the method 1500 may be used for uplink data transmission or downlink data transmission. This is not limited in the embodiments of this application.

It should also be understood that in the embodiments of this application, a same noun may be used in the methods, but in different methods, a same noun may have different meanings. For example, in the method 1400, the first indication information is used to indicate the M pilot ports, and in the method 1500, the first indication information is used to indicate the target pilot port.

In an embodiment, a communications apparatus 600 provided in this embodiment of this application includes:

a determining unit 610, configured to determine M pilot ports that are used to transmit one data stream, where M is a positive integer greater than or equal to 2; and a transceiver unit 620, configured to send, to a network device, M pilot signals and the data stream that have been subject to same precoding processing, where the M pilot signals are respectively generated based on the M pilot ports.

In one embodiment, the transceiver unit 620 is further configured to receive first indication information sent by the network device, where the first indication information is used to indicate the M pilot ports.

In one embodiment, the transceiver unit 620 is configured to receive the first indication information that is sent by the network device by using downlink control information or radio resource control signaling.

In one embodiment, a first pilot port in the M pilot ports belongs to a first pilot port set; a second pilot port in the M pilot ports belongs to a second pilot port set; pilot signals corresponding to any two pilot ports in the first pilot port set occupy a same time-frequency resource; any two pilot ports in the second pilot port set correspond to a same time-frequency resource; and a time-frequency resource corresponding to any pilot port in the first pilot port set is orthogonal to a time-frequency resource corresponding to any pilot port in the second pilot port set.

In one embodiment, any two of the M pilot ports belong to a same pilot port set; any two pilot ports in the same pilot port set correspond to a same time-frequency resource; and pilot sequences corresponding to any two different pilot ports are orthogonal.

It should be understood that, the apparatus 600 herein is presented in a form of functional units. The term "unit" herein may be an application-specific integrated circuit (ASIC), an electronic circuit, a processor (for example, a shared processor, a special purpose processor, or a group processor) configured to execute one or more software or firmware programs, a memory, a merge logic circuit, and/or another suitable component that supports the described function. In an example, a person skilled in the art may understand that, the apparatus 600 may be the terminal device in the embodiment of the foregoing method 1400; and the apparatus 600 may be configured to perform procedures and/or steps or operations in the embodiment of the foregoing method 1400 that correspond to the terminal device. To avoid repetition, details are not described herein again.

In an embodiment, a communications apparatus 600 provided in this embodiment of this application includes:
- a determining unit 610, configured to determine M pilot ports that are used by a terminal device to transmit one data stream, where M is a positive integer greater than or equal to 2; and
- a transceiver unit 620, configured to send first indication information to the terminal device, where the first indication information is used to indicate the M pilot ports.

The transceiver unit 620 is further configured to receive M pilot signals and the data stream that have been subject to same precoding processing and that are sent by the terminal device, where the M pilot signals are respectively generated based on the M pilot ports.

In one embodiment, the transceiver unit 620 is configured to send the first indication information by using downlink control information or radio resource control signaling.

In one embodiment, a first pilot port in the M pilot ports belongs to a first pilot port set; a second pilot port in the M pilot ports belongs to a second pilot port set; pilot signals corresponding to any two pilot ports in the first pilot port set occupy a same time-frequency resource; any two pilot ports in the second pilot port set correspond to a same time-frequency resource; and a time-frequency resource corresponding to any pilot port in the first pilot port set is orthogonal to a time-frequency resource corresponding to any pilot port in the second pilot port set.

In one embodiment, any two of the M pilot ports belong to a same pilot port set; any two pilot ports in the same pilot port set correspond to a same time-frequency resource; and pilot sequences corresponding to any two different pilot ports are orthogonal.

It should be understood that, the apparatus 600 herein is presented in a form of functional units. The term "unit" herein may be an application-specific integrated circuit (ASIC), an electronic circuit, a processor (for example, a shared processor, a special purpose processor, or a group processor) configured to execute one or more software or firmware programs, a memory, a merge logic circuit, and/or another suitable component that supports the described function. In an example, a person skilled in the art may understand that, the apparatus 600 may be the network device in the embodiment of the foregoing method 1400, and the apparatus 600 may be configured to perform procedures and/or steps or operations in the embodiment of the foregoing method 1400 that correspond to the network device. To avoid repetition, details are not described herein again.

In an embodiment, a communications apparatus 600 provided in this embodiment of this application includes:
- a determining unit 610, configured to determine a target pilot port that is used to transmit one data stream, where time-frequency resources corresponding to the target pilot port include a time-frequency resource corresponding to a first pilot port and a time-frequency resource corresponding to a second pilot port, and the time-frequency resource corresponding to the first pilot port is different from the time-frequency resource corresponding to the second pilot port; or a time-frequency resource corresponding to the target pilot port is the same as a time-frequency resource corresponding to the first pilot port, and a pilot sequence corresponding to the target pilot port is superposition of a pilot sequence corresponding to the first pilot port and a pilot sequence corresponding to the second pilot port; and
- a transceiver unit 620, configured to send, to a network device, a target pilot signal and the data stream that have been subject to same precoding processing, where the target pilot signal is generated based on the target pilot port.

In one embodiment, the transceiver unit 620 is further configured to receive first indication information sent by the network device, where the first indication information is used to indicate the target pilot port.

In one embodiment, the transceiver unit 620 is configured to receive the first indication information that is sent by the network device by using downlink control information or radio resource control signaling.

In one embodiment, if the time-frequency resources corresponding to the target pilot port include the time-frequency resource corresponding to the first pilot port and the time-frequency resource corresponding to the second pilot port, a time-frequency resource occupied by the target pilot port is a union set of a time-frequency resource occupied by the first pilot port and a time-frequency resource occupied by the second pilot port.

It should be understood that, the apparatus 600 herein is presented in a form of functional units. The term "unit" herein may be an application-specific integrated circuit (ASIC), an electronic circuit, a processor (for example, a shared processor, a special purpose processor, or a group processor) configured to execute one or more software or firmware programs, a memory, a merge logic circuit, and/or another suitable component that supports the described function. In an example, a person skilled in the art may understand that, the apparatus 600 may be the terminal device in the embodiment of the foregoing method 1500, and the apparatus 600 may be configured to perform procedures and/or steps or operations in the embodiment of the foregoing method 1500 that correspond to the terminal device. To avoid repetition, details are not described herein again.

In an embodiment, a communications apparatus 600 provided in this embodiment of this application includes:
- a determining unit 610, configured to determine a target pilot port that is used by a terminal device to transmit one data stream, where time-frequency resources corresponding to the target pilot port include a time-frequency resource corresponding to a first pilot port and a time-frequency resource corresponding to a second pilot port, and the time-frequency resource corresponding to the first pilot port is different from the time-frequency resource corresponding to the second pilot port; or a time-frequency resource corresponding to the target pilot port is the same as a time-frequency resource corresponding to the first pilot port, and a pilot sequence corresponding to the target pilot port is superposition of a pilot sequence corresponding to the first pilot port and a pilot sequence corresponding to a second pilot port; and
- a transceiver unit 620, configured to send first indication information to the terminal device, where the first indication information is used to indicate the target pilot port.

The transceiver unit 620 is further configured to receive a target pilot signal and the data stream that have been subject to same precoding processing and that are sent by the terminal device, where the target pilot signal is generated based on the target pilot port.

In one embodiment, the transceiver unit 620 is configured to send the first indication information by using downlink control information or radio resource control signaling.

In one embodiment, if the time-frequency resources corresponding to the target pilot port include the time-frequency resource corresponding to the first pilot port and the time-frequency resource corresponding to the second pilot port, a time-frequency resource occupied by the target pilot port is a union set of a time-frequency resource occupied by the first pilot port and a time-frequency resource occupied by the second pilot port.

It should be understood that, the apparatus 600 herein is presented in a form of functional units. The term "unit" herein may be an application-specific integrated circuit (ASIC), an electronic circuit, a processor (for example, a shared processor, a special purpose processor, or a group processor) configured to execute one or more software or firmware programs, a memory, a merge logic circuit, and/or another suitable component that supports the described function. In an example, a person skilled in the art may understand that, the apparatus 600 may be the network device in the embodiment of the foregoing method 1500, and the apparatus 600 may be configured to perform procedures and/or steps or operations in the embodiment of the foregoing method 1500 that correspond to the network device. To avoid repetition, details are not described herein again.

In an embodiment, an embodiment of this application provides still another communications apparatus 1000. The apparatus 1000 includes a processor 1010 and a transceiver 1020. In one embodiment, the apparatus further includes a memory 1030. The processor 1010, the transceiver 1020, and the memory 1030 communicate with each other by using an internal connection path. The memory 1030 is configured to store an instruction. The processor 1010 is configured to execute the instruction stored in the memory 1030, to control the transceiver 1020 to send a signal and/or receive a signal.

The processor 1010 is configured to determine M pilot ports that are used to transmit one data stream, where M is a positive integer greater than or equal to 2. The transceiver 1020 is configured to send, to a network device, M pilot signals and the data stream that have been subject to same precoding processing, where the M pilot signals are respectively generated based on the M pilot ports.

It should be understood that, the apparatus 1000 may be the terminal device in the embodiment of the foregoing method 1400, and may be configured to perform steps and/or procedures or operations in the embodiment of the foregoing method 1400 that correspond to the terminal device. In one embodiment, the memory 1030 may include a read-only memory and a random access memory, and provide an instruction and data to the processor. A part of the memory may further include a non-volatile random access memory. For example, the memory may further store information about a device type. The processor 1010 may be configured to execute the instruction stored in the memory. In addition, when the processor 1010 executes the instruction stored in the memory, the processor 1010 is configured to perform steps and/or procedures or operations in the embodiment of the foregoing method 1400 that correspond to the terminal device.

In an embodiment, the processor 1010 is configured to determine M pilot ports that are used by a terminal device to transmit one data stream, where M is a positive integer greater than or equal to 2. The transceiver 1020 is configured to send first indication information to the terminal device, where the first indication information is used to indicate the M pilot ports. The transceiver 1020 is further configured to receive M pilot signals and the data stream that have been subject to same precoding processing and that are sent by the terminal device, where the M pilot signals are respectively generated based on the M pilot ports.

It should be understood that, the apparatus 1000 may be the network device in the embodiment of the foregoing method 1400, and may be configured to perform steps and/or procedures or operations in the embodiment of the foregoing method 1400 that correspond to the network device. In one embodiment, the memory 1030 may include a read-only memory and a random access memory, and provide an instruction and data to the processor. A part of the memory may further include a non-volatile random access memory. For example, the memory may further store information about a device type. The processor 1010 may be configured to execute the instruction stored in the memory, and when the processor 1010 executes the instruction stored in the memory, the processor 1010 is configured to perform steps and/or procedures or operations in the embodiment of the foregoing method 1400 that correspond to the network device.

In an embodiment, the processor 1010 is configured to determine a target pilot port that is used to transmit one data stream, where time-frequency resources corresponding to the target pilot port include a time-frequency resource corresponding to a first pilot port and a time-frequency resource corresponding to a second pilot port, and the time-frequency resource corresponding to the first pilot port is different from the time-frequency resource corresponding to the second pilot port; or a time-frequency resource corresponding to the target pilot port is the same as a time-frequency resource corresponding to the first pilot port, and a pilot sequence corresponding to the target pilot port is superposition of a pilot sequence corresponding to the first pilot port and a pilot sequence corresponding to the second pilot port. The transceiver 1020 is configured to send, to a network device, a target pilot signal and the data stream that have been subject to same precoding processing, where the target pilot signal is generated based on the target pilot port.

It should be understood that, the apparatus 1000 may be the terminal device in the embodiment of the foregoing method 1500, and may be configured to perform steps and/or procedures or operations in the embodiment of the foregoing method 1500 that correspond to the terminal device. In one embodiment, the memory 1030 may include a read-only memory and a random access memory, and provide an instruction and data to the processor. A part of the memory may further include a non-volatile random access memory. For example, the memory may further store information about a device type. The processor 1010 may be configured to execute the instruction stored in the memory. In addition, when the processor 1010 executes the instruction stored in the memory, the processor 1010 is configured to perform steps and/or procedures or operations in the embodiment of the foregoing method 1500 that correspond to the terminal device.

In an embodiment, the processor 1010 is configured to determine a target pilot port that is used by a terminal device to transmit one data stream, where time-frequency resources corresponding to the target pilot port include a time-frequency resource corresponding to a first pilot port and a time-frequency resource corresponding to a second pilot port, and the time-frequency resource corresponding to the first pilot port is different from the time-frequency resource corresponding to the second pilot port; or a time-frequency resource corresponding to the target pilot port is the same as a time-frequency resource corresponding to the first pilot port, and a pilot sequence corresponding to the target pilot port is superposition of a pilot sequence corresponding to the first pilot port and a pilot sequence corresponding to a second pilot port. The transceiver 1020 is configured to send first indication information to the terminal device, where the first indication information is used to indicate the target pilot port. The transceiver 1020 is further configured to receive a target pilot signal and the data stream that have been subject to same precoding processing and that are sent by the terminal device, where the target pilot signal is generated based on the target pilot port.

It should be understood that, the apparatus 1000 may be the network device in the embodiment of the foregoing method 1500, and may be configured to perform steps and/or procedures or operations in the embodiment of the foregoing method 1500 that correspond to the network device. In one embodiment, the memory 1030 may include a read-only memory and a random access memory, and provide an instruction and data to the processor. A part of the memory may further include a non-volatile random access memory. For example, the memory may further store information about a device type. The processor 1010 may be configured to execute the instruction stored in the memory. In addition, when the processor 1010 executes the instruction stored in the memory, the processor 1010 is configured to perform steps and/or procedures or operations in the embodiment of the foregoing method 1500 that correspond to the network device.

Embodiment 1

A communications method is provided. The method includes:
 determining, by a network device, a target pilot in a pilot set, where the pilot set includes at least a first pilot and a second pilot, and a time-frequency resource occupied by the first pilot partially overlaps a time-frequency resource occupied by the second pilot;
 sending, by the network device, first indication information to a terminal device, where the first indication information is used to indicate the target pilot in the pilot set; and
 communicating, by the network device, with the terminal device by using the target pilot.

Embodiment 2

According to the method in Embodiment 1, a density of the time-frequency resource occupied by the first pilot is different from a density of the time-frequency resource occupied by the second pilot.

Embodiment 3

According to the method in Embodiment 1 or 2, the time-frequency resource occupied by the first pilot is a union set of the time-frequency resource occupied by the second pilot and a time-frequency resource occupied by a third pilot in the pilot set.

Embodiment 4

According to the method in any one of Embodiments 1 to 3, a part of a pilot sequence corresponding to the first pilot is the same as at least a part of a pilot sequence corresponding to the second pilot.

Embodiment 5

According to the method in any one of Embodiments 1 to 4, the sending, by the network device, first indication information to a terminal device includes:
 sending, by the network device, the first indication information to the terminal device by using radio resource control RRC signaling or downlink control information DCI.

Embodiment 6

A communications method is provided. The method includes:
 determining, by a network device in a pilot set, M pilots that are used to transmit N data streams, where M and N are positive integers, and M is greater than N;
 sending, by the network device, first indication information to a terminal device, where the first indication information is used to indicate the M pilots in the pilot set; and
 communicating, by the network device, the N data streams to the terminal device by using the M pilots.

Embodiment 7

According to the method in Embodiment 6, the first indication information is further used to indicate correspondences between the N data streams and the M pilots.

Embodiment 8

According to the method in Embodiment 6 or 7, the sending, by the network device, first indication information to a terminal device includes:
 sending, by the network device, the first indication information to the terminal device by using radio resource control RRC signaling or downlink control information DCI.

Embodiment 9

A communications method is provided. The method includes:
 determining, by a terminal device, a target pilot in a pilot set, where the pilot set includes at least a first pilot and a second pilot, and a time-frequency resource occupied by the first pilot partially overlaps a time-frequency resource occupied by the second pilot; and
 communicating, by the terminal device, with a network device by using the target pilot.

Embodiment 10

According to the method in Embodiment 9, a density of the time-frequency resource occupied by the first pilot is different from a density of the time-frequency resource occupied by the second pilot.

Embodiment 11

According to the method in Embodiment 9 or 10, the time-frequency resource occupied by the first pilot is a union set of the time-frequency resource occupied by the second pilot and a time-frequency resource occupied by a third pilot in the pilot set.

Embodiment 12

According to the method in Embodiments 9 to 11, a part of a pilot sequence corresponding to the first pilot is the same as at least a part of a pilot sequence corresponding to the second pilot.

Embodiment 13

According to the method in Embodiments 9 to 12, the method further includes:
receiving, by the terminal device, first indication information sent by the network device, where the first indication information is used to indicate the target pilot in the pilot set; and
the determining, by a terminal device, a target pilot in a pilot set includes:
determining, by the terminal device, the target pilot in the pilot set according to the first indication information.

Embodiment 14

According to the method in Embodiment 13, the receiving, by the terminal device, first indication information sent by the network device includes:
receiving, by the terminal device, the first indication information that is sent by the network device by using radio resource control RRC signaling or downlink control information DCI.

Embodiment 15

A communications method is provided. The method includes:
determining, by a terminal device in a pilot set, M pilots that are used to transmit N data streams, where M and N are positive integers, and M is greater than N; and
communicating, by the terminal device, the N data streams to a network device by using the M pilots.

Embodiment 16

According to the method in Embodiment 15, the method further includes:
receiving, by the terminal device, first indication information sent by the network device, where the first indication information is used to indicate the M pilots that are used to transmit the N data streams and that are in the pilot set; and
the determining, by a terminal device in a pilot set, M pilots that are used to transmit N data streams includes:
determining, by the terminal device, the M pilots in the pilot set according to the first indication information.

Embodiment 17

According to the method in Embodiment 16, the first indication information is further used to indicate correspondences between the N data streams and the M pilots; and
the communicating, by the terminal device, the N data streams to a network device by using the M pilots includes:
determining, by the terminal device in the M pilots based on the correspondences, a pilot corresponding to each of the N data streams; and
communicating, by the terminal device, each of the N data streams by using the pilot corresponding to each of the N data streams.

Embodiment 18

According to the method in Embodiment 16 or 17, the receiving, by the terminal device, first indication information sent by the network device includes:
receiving, by the terminal device, the first indication information that is sent by the network device by using radio resource control RRC signaling or downlink control information DCI.

Embodiment 19

A communications apparatus is provided. The apparatus includes:
a determining unit, configured to determine a target pilot in a pilot set, where the pilot set includes at least a first pilot and a second pilot, and a time-frequency resource occupied by the first pilot partially overlaps a time-frequency resource occupied by the second pilot; and
a transceiver unit, configured to send first indication information to a terminal device, where the first indication information is used to indicate the target pilot in the pilot set, where
the transceiver unit is further configured to communicate with the terminal device by using the target pilot.

Embodiment 20

According to the apparatus in Embodiment 19, a density of the time-frequency resource occupied by the first pilot is different from a density of the time-frequency resource occupied by the second pilot.

Embodiment 21

According to the apparatus in Embodiment 19 or 20, the time-frequency resource occupied by the first pilot is a union set of the time-frequency resource occupied by the second pilot and a time-frequency resource occupied by a third pilot in the pilot set.

Embodiment 22

According to the apparatus in any one of Embodiments 19 to 21, a part of a pilot sequence corresponding to the first pilot is the same as at least a part of a pilot sequence corresponding to the second pilot.

Embodiment 23

According to the apparatus in any one of Embodiments 19 to 22, the transceiver unit is configured to:
send the first indication information to the terminal device by using radio resource control RRC signaling or downlink control information DCI.

Embodiment 24

A communications apparatus is provided. The apparatus includes:
a determining unit, configured to determine, in a pilot set, M pilots that are used to transmit N data streams, where M and N are positive integers, and M is greater than N; and a transceiver unit, configured to send first indication information to the terminal device, where the first indication information is used to indicate the M pilots in the pilot set, where the transceiver unit is further configured to communicate the N data streams to the terminal device based on the M pilots.

Embodiment 25

According to the apparatus in Embodiment 24, the first indication information is further used to indicate correspondences between the N data streams and the M pilots.

Embodiment 26

According to the apparatus in Embodiment 24 or 25, the transceiver unit is configured to:
send the first indication information to the terminal device by using radio resource control RRC signaling or downlink control information DCI.

Embodiment 27

A communications apparatus is provided. The apparatus includes:
a determining unit, configured to determine a target pilot in a pilot set, where the pilot set includes at least a first pilot and a second pilot, and a time-frequency resource occupied by the first pilot partially overlaps a time-frequency resource occupied by the second pilot; and
a transceiver unit, configured to communicate with a network device by using the target pilot.

Embodiment 28

According to the apparatus in Embodiment 27, a density of the time-frequency resource occupied by the first pilot is different from a density of the time-frequency resource occupied by the second pilot.

Embodiment 29

According to the apparatus in Embodiment 27 or 28, the time-frequency resource occupied by the first pilot is a union set of the time-frequency resource occupied by the second pilot and a time-frequency resource occupied by a third pilot in the pilot set.

Embodiment 30

According to the apparatus in any one of Embodiments 27 to 29, a part of a pilot sequence corresponding to the first pilot is the same as at least a part of a pilot sequence corresponding to the second pilot.

Embodiment 31

According to the apparatus in any one of Embodiments 27 to 30, the transceiver unit is further configured to:
receive first indication information sent by the network device, where the first indication information is used to indicate the target pilot in the pilot set; and
the determining unit is configured to:
determine the target pilot in the pilot set according to the first indication information.

Embodiment 32

According to the apparatus in Embodiment 31, the transceiver unit is configured to:
receive the first indication information that is sent by the network device by using radio resource control RRC signaling or downlink control information DCI.

Embodiment 33

A communications apparatus is provided. The apparatus includes:
a determining unit, configured to determine, in a pilot set, M pilots that are used to transmit N data streams, where M and N are positive integers, and M is greater than N; and
a transceiver unit, configured to communicate the N data streams to a network device based on the M pilots.

Embodiment 34

According to the apparatus in Embodiment 33, the transceiver unit is further configured to:
receive first indication information sent by the network device, where the first indication information is used to indicate the M pilots that are used to transmit the N data streams and that are in the pilot set; and
the determining unit is configured to:
determine the M pilots in the pilot set according to the first indication information.

Embodiment 35

According to the apparatus in Embodiment 34, the first indication information is further used to indicate correspondences between the N data streams and the M pilots;
the determining unit is further configured to determine, in the M pilots based on the correspondences, a pilot corresponding to each of the N data streams; and
the transceiver unit is further configured to communicate each of the N data streams by using the pilot corresponding to each of the N data streams.

Embodiment 36

According to the apparatus in Embodiment 34 or 35, the transceiver unit is configured to:
receive the first indication information that is sent by the network device by using radio resource control RRC signaling or downlink control information DCI.

It should be understood that, the transceiver may include a transmitter and a receiver. The transceiver may further include an antenna. There may be one or more antennas. The memory may be a separate component, or may be integrated into the processor. Each of the foregoing components or some components may be integrated into a chip for implementation, for example, integrated into a baseband chip for implementation.

It should also be understood that, in the embodiments of this application, the processor in the foregoing apparatus may be a central processing unit (CPU). The processor may alternatively be another general purpose processor, a digital signal processor (DSP), an application-specific integrated circuit (ASIC), a field-programmable gate array (FPGA) or another programmable logical device, discrete gate or transistor logical device, discrete hardware component, or the like. The general purpose processor may be a microprocessor, or the processor may be any conventional processor or the like.

In an implementation process, steps or operations in the foregoing methods can be implemented by using a hardware integrated logic circuit in the processor, or by using instructions in a form of software. The steps or operations of the method disclosed with reference to the embodiments of this application may be directly performed by a hardware processor, or may be performed by using a combination of hardware in the processor and a software unit. A software unit may be located in a mature storage medium in the art, such as a random access memory, a flash memory, a read-only memory, a programmable read-only memory, an electrically erasable programmable memory, a register, or the like. The storage medium is located in the memory, and the processor executes instructions in the memory and completes the steps or operations in the foregoing methods in combination with hardware of the processor. To avoid repetition, details are not described herein again.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer instructions are loaded and executed on a computer, the procedure or functions according to the embodiments of this application are all or partially generated. The computer may be a general purpose computer, a special-purpose computer, a computer network, or other programmable apparatuses. The computer instructions may be stored in a computer-readable storage medium or may be transmitted from a computer-readable storage medium to another computer-readable storage medium. For example, the computer instructions may be transmitted from a web site, computer, server, or data center to another web site, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

A person of ordinary skill in the art may be aware that, in combination with the examples described in the embodiments disclosed in this specification, units and algorithm steps or operations may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps or operations of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communications method comprising:
  determining, by a terminal device, M pilot ports used to transmit one data stream, wherein M is a positive integer greater than or equal to 2, wherein any two of the M pilot ports belong to a same pilot port set and any two pilot ports in the same pilot port set correspond to a same time-frequency resource, wherein pilot sequences corresponding to any two different pilot ports are orthogonal, wherein a time-frequency resource corresponding to any pilot port in a first pilot port set is orthogonal to a time-frequency resource corresponding to any pilot port in a second pilot port set; and sending, by the terminal device to a network device, M pilot signals and the data stream that have been subject to a same precoding processing, wherein the M pilot signals are respectively generated based on the M pilot ports.

2. The method according to claim 1, wherein a first pilot port in the M pilot ports belongs to the first pilot port set; a second pilot port in the M pilot ports belongs to the second pilot port set; pilot signals corresponding to any two pilot ports in the first pilot port set occupy a same time-frequency resource; and any two pilot ports in the second pilot port set correspond to a same time-frequency resource.

3. A communications method comprising:
determining, by a network device, M pilot ports used by a terminal device to transmit one data stream, wherein M is a positive integer greater than or equal to 2, wherein any two of the M pilot ports belong to a same pilot port set and any two pilot ports in the same pilot port set correspond to a same time-frequency resource, wherein pilot sequences corresponding to any two different pilot ports are orthogonal, wherein a time-frequency resource corresponding to any pilot port in a first pilot port set is orthogonal to a time-frequency resource corresponding to any pilot port in a second pilot port set;

sending, by the network device, first indication information to the terminal device, wherein the first indication information is used to indicate the M pilot ports; and receiving, by the network device, M pilot signals and the data stream that have been subject to a same precoding processing and that are sent by the terminal device, wherein the M pilot signals are respectively generated based on the M pilot ports.

4. The method according to claim 3, wherein a first pilot port in the M pilot ports belongs to the first pilot port set; a second pilot port in the M pilot ports belongs to the second pilot port set; pilot signals corresponding to any two pilot ports in the first pilot port set occupy a same time-frequency resource; and any two pilot ports in the second pilot port set correspond to a same time-frequency resource.

5. A communications apparatus comprising:
a determining unit configured to determine M pilot ports used to transmit one data stream, wherein M is a positive integer greater than or equal to 2, wherein any two of the M pilot ports belong to a same pilot port set and any two pilot ports in the same pilot port set correspond to a same time-frequency resource, wherein pilot sequences corresponding to any two different pilot ports are orthogonal, wherein a time-frequency resource corresponding to any pilot port in a first pilot port set is orthogonal to a time-frequency resource corresponding to any pilot port in a second pilot port set; and a transceiver unit configured to send to a network device, M pilot signals and the data stream that have been subject to a same precoding processing, wherein the M pilot signals are respectively generated based on the M pilot ports.

6. The apparatus according to claim 5, wherein a first pilot port in the M pilot ports belongs to the first pilot port set; a second pilot port in the M pilot ports belongs to the second pilot port set; pilot signals corresponding to any two pilot ports in the first pilot port set occupy a same time-frequency resource; and any two pilot ports in the second pilot port set correspond to a same time-frequency resource.

7. A communications apparatus comprising:
a determining unit configured to determine M pilot ports used by a terminal device to transmit one data stream, wherein M is a positive integer greater than or equal to 2, wherein any two of the M pilot ports belong to a same pilot port set and any two pilot ports in the same pilot port set correspond to a same time-frequency resource, wherein pilot sequences corresponding to any two different pilot ports are orthogonal, wherein a time-frequency resource corresponding to any pilot port in a first pilot port set is orthogonal to a time-frequency resource corresponding to any pilot port in a second pilot port set; and a transceiver unit configured to send first indication information to the terminal device, wherein the first indication information is used to indicate the M pilot ports, wherein the transceiver unit is further configured to receive M pilot signals and the data stream that have been subject to a same precoding processing and that are sent by the terminal device, wherein the M pilot signals are respectively generated based on the M pilot ports.

8. The apparatus according to claim 7, wherein a first pilot port in the M pilot ports belongs to the first pilot port set; a second pilot port in the M pilot ports belongs to the second pilot port set; pilot signals corresponding to any two pilot ports in the first pilot port set occupy a same time-frequency resource; and any two pilot ports in the second pilot port set correspond to a same time-frequency resource.

* * * * *